(12) United States Patent
Naka et al.

(10) Patent No.: US 7,755,597 B2
(45) Date of Patent: Jul. 13, 2010

(54) LIQUID CRYSTAL DISPLAY DEVICE AND DRIVING METHOD USED IN SAME

(75) Inventors: Ken-Ichirou Naka, Kawasaki (JP); Michiaki Sakamoto, Kawasaki (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 1063 days.

(21) Appl. No.: 11/355,974

(22) Filed: Feb. 17, 2006

(65) Prior Publication Data

US 2006/0187183 A1 Aug. 24, 2006

(30) Foreign Application Priority Data

Feb. 21, 2005 (JP) ............................. 2005-044855

(51) Int. Cl.
G09G 3/36 (2006.01)
G02F 1/1335 (2006.01)

(52) U.S. Cl. ........................................ 345/102; 345/87

(58) Field of Classification Search ........... 345/30–111; 349/61–71

See application file for complete search history.

(56) References Cited

U.S. PATENT DOCUMENTS

| | | | | |
|---|---|---|---|---|
| 5,712,694 A | * | 1/1998 | Taira et al. | 349/9 |
| 5,816,677 A | * | 10/1998 | Kurematsu et al. | 362/609 |
| 5,931,555 A | * | 8/1999 | Akahane et al. | 362/613 |
| 6,603,452 B1 | * | 8/2003 | Serita | 345/88 |
| 7,490,970 B2 | * | 2/2009 | Liao | 362/624 |
| 2006/0187380 A1 | * | 8/2006 | Tsuda et al. | 349/96 |

FOREIGN PATENT DOCUMENTS

| | | |
|---|---|---|
| CN | 1400491 A | 3/2003 |
| JP | 2003-76342 | 3/2003 |
| JP | 2003-344834 | 12/2003 |
| JP | 2004-061747 | 2/2004 |
| JP | 2004-309639 | 11/2004 |
| JP | 2005-017493 | 1/2005 |

OTHER PUBLICATIONS

Japanese Patent Office issued Japanese Office Action dated Nov. 4, 2009, Application No. 2005-044855.

* cited by examiner

*Primary Examiner*—Srilakshmi K Kumar
(74) *Attorney, Agent, or Firm*—Young & Thompson

(57) ABSTRACT

A liquid crystal display device is provided which is capable of reducing a number of components and fabricating processes and of realizing a bright display even at time of a transmissive display and of simplifying configurations of a data signal. Transistors are controlled ON/OFF based on selecting signals input to selecting signal lines and a one kind of data signal input from data lines distributed and supplied, as a sub-pixel data, to a data electrode selected based on selecting signals corresponding to a successive additive color mixture or juxtapositional additive color mixture process. At time of the transmissive display operation, data electrodes corresponding to three sub-pixels making up each pixel are simultaneously selected and, at time of the reflective display operation, data electrodes selected based on selecting signal corresponding to the juxtapositional additive color mixture.

13 Claims, 18 Drawing Sheets

FIG. 7

| Data Signal | | | | | |
|---|---|---|---|---|---|
| S1i,j=R Signal | ON | OFF | ON | OFF | OFF |
| S2i,j=G Signal | ON | OFF | OFF | ON | OFF |
| S3i,j=B Signal | ON | OFF | OFF | OFF | ON |
| Displayed Color | White | Black | Red | Green | Blue |

FIG. 8

| | 1 Frame | | |
|---|---|---|---|
| | Field 1 | Field 2 | Field 3 |
| sl1 | H | H | H |
| sl2 | H | H | H |
| sl3 | H | H | H |
| Data Signal | S1i,j | S2i,j | S3i,j |
| LED (Red) | ON | OFF | OFF |
| LED (Green) | OFF | ON | OFF |
| LED (Blue) | OFF | OFF | ON |

FIG.10

|  | 1 Frame | | |
|---|---|---|---|
|  | Field 1 | Field 2 | Field 3 |
| sl1 | H | L | L |
| sl2 | L | H | L |
| sl3 | L | L | H |
| Data Signal | S1i,j | S2i,j | S3i,j |
| LED (Red) | OFF | OFF | OFF |
| LED (Green) | OFF | OFF | OFF |
| LED (Blue) | OFF | OFF | OFF |

LIQUID CRYSTAL DISPLAY DEVICE AND DRIVING METHOD USED IN SAME

BACKGROUND OF THE INVENTION

1. Field of the Invention

The present invention relates to a liquid crystal display device and a driving method to be used in the liquid crystal display device and more particularly to the liquid crystal display device suitably used when either of transmissive display or reflective display is selected depending on variations in environments for using the liquid crystal display device and the driving method to be used in the liquid crystal display device.

The present application claims priority of Japanese Patent Application No. 2005-044855 filed on Feb. 21, 2005, which is hereby incorporated by reference.

2. Description of the Related Art

A liquid crystal display device is classified into two types of devices, one being a transmissive-type liquid crystal display device in which light emitted from an embedded backlight is transmitted through a liquid crystal panel to achieve displaying and another being a reflective-type liquid crystal display device in which external light such as sunlight is reflected in a liquid crystal panel to achieve displaying. In the liquid crystal display device, to perform a color display operation, ordinarily, a color filter is used. However, in recent years, a new type of liquid crystal device is fabricated which performs a field sequential (FS) driving operation by using a light source made up of three kinds of light emitting elements each emitting colored light corresponding to one of three primary colors of red (R), green (G), and blue (B). In the FS driving operation, as a backlight, for example, RGB three-primary color lamps, one emitting R, another emitting G, and another emitting B are used and each of the lamps is turned ON or OFF in a timeshared manner.

The conventional liquid crystal display device of this type includes, as shown in FIG. 17, an upper-side substrate 1, a lower-side substrate 2, an upper-side retardation plate 3, an upper-side polarizer 4, a lower-side retardation plate 5, and a lower-side polarizer 6. On the upper-side substrate 1 are formed a plurality of data electrodes 7, a plurality of scanning electrodes 8, a plurality of TFTs (Thin Film Transistors) 9, and a plurality of pixel electrodes 10. The data electrodes 7 are formed in a first direction at predetermined intervals to input a sub-pixel data signal corresponding to each sub-pixel obtained by dividing each pixel into three portions each emitting one of the three primary colors of R, G, and B. The scanning electrodes 8 are formed in a second direction orthogonal to the first direction to input a scanning signal. The TFTs 9 and pixel electrodes 10 make up pixel cells formed in a region of intersections of each of the data electrodes 7 and each of the scanning electrodes 8. On the lower-side substrate 2 are formed a reflecting plate/coloring layer 11 and a coloring layer 12. The coloring layer 11 is made up of the three primary color layers of R, G, and B being adjacent to one another. On a side opposite to visually-recognized side (viewer side) of the lower polarizer 6 is provided a light source (backlight). The backlight is made up of three kinds of light emitting elements each emitting light corresponding to one of the three primary colors of R, G, and B.

FIG. 18 is a cross-sectional view of the liquid crystal panel of FIG. 17 taken along a line A-A. As shown in FIG. 18, a liquid crystal layer 14 is sandwiched between the upper-side substrate I and the lower-side substrate 2 and a semi-transmissive light reflecting film (hereinafter referred to as semi-transmissive reflecting film) 13 is formed on the liquid crystal layer 14 side on the lower-side substrate 2. One coloring layer 12 is formed on all regions (aperture portion) of each pixel cell.

In the conventional liquid crystal display device, by supplying a sub-pixel data signal to a pixel cell selected by a scanning signal, out of pixel cells formed in a region of intersections of the data electrodes 7 and scanning electrodes 8, light fed from a viewer side or the light source is modulated in a manner to correspond to the display screen. In this case, the FS driving operation is performed, that is, a color display operation is performed according to a successive additive color mixture method in which one frame is divided into three fields and each of the light emitting elements including one emitting R light, another emitting G light, and another emitting B light is turned ON in every field sequentially in terms of time. At time of the transmissive display operation, by simultaneous lighting of the light emitting elements including one emitting R light, another emitting G light, and another emitting B light, white light is provided and a color display operation is performed according to a juxtapositional additive color mixture method by using light passing through the coloring layer 12. At time of the reflective display operation, by passing of external light such as sunlight through the reflecting plate/coloring layer 11 and reflection of the light, the color display operation is performed according to the juxtapositional additive color mixture method.

A conventional technology of this type, in addition to the above liquid crystal display device, is disclosed in a following reference. That is, a liquid crystal display device disclosed in Reference 1 (Japanese Patent Application Laid-open No. 2003-076342, Abstract, FIG. 1) includes a liquid crystal display panel having a color filter and a backlight. The color filter has a plurality of kinds of coloring layers different in color. The backlight has a plurality of types of light emitting elements each emitting colored light corresponding to a color of each coloring layer. In the case of the transmissive display operation, display is performed by the field sequential driving operation. That is, one frame is divided into a plurality of fields and, during one frame, a plurality of types of light emitting elements emits light sequentially in terms of time and the liquid crystal panel is driven in every field in synchronization with light emitting timing of the light emitting elements.

However, the above conventional liquid crystal display device has following problems. The first problem is that, not only mounting of the upper-side retardation plate 3 and lower-side retardation plate 5 but also a process of forming the reflecting plate/coloring layer 11 is required, which causes the number of components and fabricating processes to be increased and makes it difficult to provide a low-priced product. The second problem is that, at the time of the transmissive display operation, a display screen is dark. The third problem is that three kinds of data signals to correspond to the FS driving, transmissive display, and reflective display are necessary, which causes configurations to be complicated.

The reason for the occurrence of the first problem is that precise patterning on the reflecting plate/coloring layer 11 is required, which causes fabricating processes to increase and yields to be reduced. The fabricating process thus includes a series of complicated processes including stacking of the reflecting plate in layers, coating of a resist, exposure of patterns, development, etching on the reflecting plate, peeling of a resist, and cleaning. Moreover, in the case of using a mirror reflecting plate as the reflecting plate, a dark display screen appears when the display is seen from a direction other than a direction of specular reflection of incident light, which makes it difficult to see the display fully in some cases. The light reflected specularly is superimposed on surface reflected light fed from the upper-side polarizer 4 and lower-side polarizer 6 and, as a result, its viewability decreases. To solve this problem, formation of bumps and dips to reduce the specularly reflected light component by using a resin or a like or insertion of a diffusive sheet in which tiny transparent particles are dispersed between the upper-side polarizer 4 and lower-side polarizer 6 and between the upper-side substrate 1 and lower-side substrate 2 is required, which increases further the number of fabricating processes and decreases cost-performance. Moreover, it is necessary that, on a side being opposite to the liquid crystal layer 14 on the upper-side substrate 1 and lower-side substrate 2 are stacked the upper-side retardation plate 3 and lower-side retardation plate 5 and the upper-side polarizer 4 and lower-side polarizer 6 in layers, which also decreases yields. In particular, as a material for the upper-side retardation plate 3 and lower-side retardation plate 5, a norbornene transparent resin having a lower wavelength dispersion characteristic is used, however, the material is expensive, which makes it difficult to lower the price of the liquid crystal display device.

The reason for the occurrence of the second problem is that, as shown in FIG. 18, the coloring layer 12 is formed in an entire aperture of each pixel cell. As a result, the coloring layer 12 is formed in both a transmissive region and a reflective region of each pixel cell and light fed from the backlight is absorbed by the coloring layer 12. For example, when red is to be displayed, the pixel cell corresponding to blue and green coloring layers 12 are turned OFF and no light is emitted from the pixel cell, however, light passes through the blue and green coloring layer 12 and, therefore, efficiency of using light is decreased when compared with the case of the FS driving operation in which only the transmissive driving operation is performed without using the coloring layer 12. As shown in FIG. 19, when the coloring layer 12 is used, a ratio of the coloring layer 12 to the transmissive aperture is 100%. and a ratio of luminance occurring when the coloring layer is used to luminance occurring when the FS driving operation is performed without using the coloring layer is about 55% in the case (1) when pixel cells in a pixel are driven simultaneously and about 30% in the case (2) when pixel cells in the pixel are driven individually. In both the cases, luminance is lowered accordingly.

Therefore, in order to obtain luminance being equivalent to luminance obtained by the FS driving operation in which only the transmissive driving operation is performed without using the coloring layer 12, the luminance needs to be higher at least two times to three times than the luminance of the backlight and, as a result, a problem arises that power consumption is greatly increased. Moreover, at the time of the reflective display operation, light passes through the coloring layer 12 twice, whereas, at the time of the transmissive display operation, light passes through the coloring layer 12 only once. Therefore, if the coloring layer 12 is so configured as to operate optimally in the reflective display, color reproducibility decreases in the transmissive display and if the coloring layer 12 is so configured as to operate optimally in the transmissive display, a display screen becomes dark in the reflective display. For example, when a chromaticity region being equivalent to 40% of the region specified by NTSC (National Television System Committee) is to be obtained at the time of the reflective display operation, the chromaticity region becomes about 20% of the region specified by NTSC at the time of the transmissive display. Also, if a chromaticity region being equivalent to 40% of the region specified by NTSC is to be obtained at the time of the transmissive display, external light is almost absorbed and a dark display appears in the reflective display.

The reason for the occurrence of the third problem is that, since a driving frequency of the data signal differs depending on the FS driving, transmissive display, reflective display, a circuit to generate data signal corresponding to each of the FS driving, transmissive display, and reflective display operations needs to be provided. Moreover, in the case of the FS driving, the pixel cells each making up one pixel includes a pixel cell which is turned ON for displaying and a pixel cell which is turned OFF for no displaying and, therefore, another additional signal besides the data signal needs to be generated. That is, a signal to drive the R coloring layer 12, a signal to drive the G coloring layer 12, and a signal to drive the B coloring layer 12 need to be individually generated and, therefore, the number of data signals being larger by three times than that required when each pixel cell in a pixel is simultaneously driven. Also, even when each pixel cell is driven simultaneously, a signal for each pixel cell needs to be generated, which causes the configurations of the liquid crystal display device to be more complicated.

In addition, as shown in FIG. 17 or FIG. 18, the TFT 9 are formed on the upper-side substrate 2. However, since it is impossible to form the TFTs 9 directly on a thin-film substrate or plastic, after formation of the TFTs 9 on a glass substrate with a thickness of about 0.5 mm to 1.0 mm, a chemical etching method or physical polishing method is performed on the TFT 9 to obtain their thin configuration. In this case, control of a film thickness is difficult and there is a limit to a degree (for example, 0.3 mm) to which a film is made thin. Due to this, a problem arises that a decrease in visual recognition caused by the occurrence of parallax and/or color mixture occurs. Moreover, specific gravity of a glass substrate is comparatively high and it is, therefore, difficult to make the liquid crystal display device lightweight and thin to a degree to which a mobile device such as a portable phone or PDA (Personal Digital Assistants) requires.

Furthermore, the liquid crystal display device disclosed in the above Patent Reference 1, since it has configurations similar to those of the liquid crystal display device shown in FIG. 17, has the same problems as described above.

SUMMARY OF THE INVENTION

In view of the above, it is an object of the present invention to provide a liquid crystal display device which is capable of reducing the number of components and fabricating processes and making bright a display screen even at time of a transmissive display operation and making simple configurations of a data signal, and a method of driving the liquid crystal display device.

According to a first aspect of the present invention, there is provided a liquid crystal display device including:

a light source;

a liquid crystal panel; and at least one driving circuit, wherein the light source includes:

three kinds of light emitting elements each emitting light corresponding to a color out of three colors of red, green, and blue;

wherein the liquid crystal panel includes:

a plurality of data electrodes formed at predetermined intervals in a first direction to input a sub-pixel data signal to sub-pixels;

a plurality of scanning electrodes formed at predetermined intervals in a second direction orthogonal to the first direction to input a scanning signal;

a plurality of pixel cells formed in a region of intersections of each of the data electrodes and each of the scanning electrodes, the sub-pixels obtained by dividing each pixel into three regions corresponding to three colors of red, green, and blue; and a semi-transmissive light reflecting plate, wherein light fed from a viewer side or the light source is modulated in a manner to correspond to an image to be displayed by supply of the sub-pixel data signal to pixel cells selected by the scanning signal;

wherein three kinds of coloring layers each corresponding to one each of the three colors of red, green, and blue, are formed in part on each of the three sub-pixels;

wherein the semi-transmissive light reflecting plate allows colored light having entered from the light source to be transmitted and to output the colored light to the viewer side, to reflect light having entered through the coloring layer from the viewer side, to output the colored light through the coloring layer to the viewer side;

wherein the at least one driving circuit is configured to, at an operating time in a transmissive display mode, perform a color display operation according to a successive additive color mixture method by dividing one frame into three fields to drive the liquid crystal panel in every field and by turning ON the light emitting elements including one emitting red light, another emitting green light, and another emitting blue light, sequentially in terms of time, in synchronization with timing of driving the liquid crystal panel, and, at an operating time in a reflective display mode, perform a color display operation according to a juxtapositional additive color mixture method by driving the liquid crystal panel in every frame and by using light passing through the coloring layer corresponding to each of the three colors of red, green, and blue.

In the foregoing first aspect, a preferable mode is one wherein the at least one driving circuit has a data signal distributing unit to distribute and input one kind of data signal, as the sub-pixel data signal, to the data electrodes selected based on a selecting signal corresponding to the successive additive color mixture method or the juxtapositional additive color mixture.

Also, a preferable mode is one wherein the data signal distributing unit, at the operating time in the transmissive display mode, simultaneously selects the data electrodes corresponding to the three sub-pixels making up each pixel based on the selecting signal corresponding to the successive additive color mixture method and, at an operating time in a reflective display mode, selects the data electrodes corresponding to a color of the coloring layer based on the selecting signal corresponding to the juxtapositional additive color mixture method.

Also, a preferable mode is one wherein the semi-transmissive light reflecting plate is provided outside of the liquid crystal panel and on a side opposite to the viewer side.

Also, a preferable mode is one wherein the semi-transmissive light reflecting plate has a transmissive region formed inside of the liquid crystal panel to allow the colored light having entered from the light source to be transmitted and to output the colored light to the viewer side and a reflective region to reflect light having entered through the coloring layer from the viewer side and to output the light through the coloring layer to the viewer side for every sub-pixel, wherein the reflective region is formed in a manner to correspond to the coloring layer.

According to a second aspect of the present invention, there is provided a method of driving a liquid crystal display device including a light source; a liquid crystal panel; and at least one driving circuit, wherein the light source includess three kinds of light emitting elements each emitting light corresponding to a color out of three colors of red, green, and blue, wherein the liquid crystal panel includes a plurality of data electrodes formed at predetermined intervals in a first direction to input a sub-pixel data signal for sub-pixels, a plurality of scanning electrodes formed at predetermined intervals in a second direction orthogonal to the first direction to input a scanning signal, a plurality of pixel cells formed in a region of intersections of each of the data electrodes and each of the scanning electrodes, the sub-pixels obtained by dividing each pixel into three regions corresponding to three colors of red, green, and blue, and a semi-transmissive light reflecting plate, wherein light fed from a viewer side or the light source is modulated in a manner to correspond to an image to be displayed by supply of the sub-pixel data signal to pixel cells selected by the scanning signal, wherein three kinds of coloring layers each corresponding to one each of the three colors of red, green, and blue, are formed in part on each of the three sub-pixels, wherein the semi-transmissive light reflecting plate allows colored light having entered from the light source to be transmitted and to output the colored light to the viewer side, to reflect light having entered through the coloring layer from the viewer side, to output the colored light through the coloring layer to the viewer side, the method including:

at an operating time in a transmissive display mode, making the at least one driving circuit perform a color display operation according to a successive additive color mixture method by dividing one frame into three fields to drive the liquid crystal panel in every field and by turning ON the light emitting elements including one emitting red light, another emitting green light, and another emitting blue light, sequentially in terms of time, in synchronization with timing of driving the liquid crystal panel, and at an operating time in a reflective display mode, making the at least one driving circuit perform a color display operation according to a juxtapositional additive color mixture method by driving the liquid crystal panel in every frame and by using light passing through the coloring layer corresponding to each of the three colors of red, green, and blue.

In the foregoing second aspect, a preferable mode is one that wherein includes step of distributing and inputting one kind of data signal, as the sub-pixel data signal, to the data electrodes selected based on a selecting signal corresponding to the successive additive color mixture method or the juxtapositional additive color mixture.

Also, a preferable mode is one that wherein includes a step of, at time of the transmissive display operation, simultaneously selecting the data electrodes corresponding to three sub-pixels making up each pixel based on the selecting signal corresponding to the successive additive color mixture method and, at time of the reflective display operation, selecting the data electrodes corresponding to a color of the coloring layer based on the selecting signal corresponding to the juxtapositional additive color mixture method.

According to a third aspect of the present invention, there is provided a liquid crystal display device including:

a light source;

a liquid crystal panel; and at least one driving means, wherein the light source includes:

a plurality of colored light emitting elements each emitting colored light corresponding to one each of a plurality of colors;

wherein the liquid crystal panel includes:

a plurality of data electrodes formed at predetermined intervals in a first direction, each of which inputs a sub-pixel data signal for sub-pixels;

a plurality of scanning electrodes formed at predetermined intervals in a second direction orthogonal to the first direction, each of which inputs a scanning signal;

a plurality of pixel cells formed in a region of intersections of each of the data electrodes and each of the scanning electrodes, the sub-pixels obtained by dividing each pixel into a plurality of regions corresponding to one each of the plurality of the colors; and a semi-transmissive light reflecting means, wherein light fed from a viewer side or the light source is modulated in a manner to correspond to an image to be displayed by supply of the sub-pixel data signal to pixel cells selected by the scanning signal;

wherein a plurality of coloring layers each corresponding to one each of the plurality of the colors, are formed in-part on each of the sub-pixels;

wherein the semi-transmissive light reflecting means allows colored light having entered from the light source to be transmitted and to output the colored light to the viewer side, to reflect light having entered through the coloring layer from the viewer side, to output the colored light through the coloring layer to the viewer side;

wherein the at least one driving means is configured to, at an operating time in a transmissive display mode, perform a color display operation according to a successive additive color mixture method by dividing one frame into the plurality of fields to drive the liquid crystal panel in every field and by turning ON and OFF a plurality of the colored light emitting elements, sequentially in terms of time, in synchronization with timing of driving the liquid crystal panel, and, at an operating time in a reflective display mode, perform a color display operation according to a juxtapositional additive color mixture method by driving the liquid crystal panel in every frame and by using light passing through the coloring layer corresponding to each of the plurality of the colors.

With the above configuration, the coloring layer corresponding to each of the three colors of R, G, and B is formed in part of the corresponding pixel cell and, therefore, at time of the transmissive display operation, wide color reproducibility can be achieved and, at time of the reflective display operation, bright display can be realized.

With another configuration as above, the data signal distributing unit distributes and inputs one kind of data signal, as a sub-pixel data signal, to the data electrode selected based on a selecting signal corresponding to the successive additive color mixture or juxtapositional additive color mixture process and, therefore, it is not necessary to mount a circuit to generate a data signal corresponding to the FS driving, transmissive display, and reflective display, which enables simplification of the configurations of the liquid crystal display panel. Moreover, the semi-transmissive light reflecting plate is provided outside of the liquid crystal panel and on a side opposite to a viewer side and, therefore, configurations of the liquid crystal panel can be simplified.

With still another configuration as above, the semi-transmissive light reflecting plate is formed inside of the liquid crystal panel and has a transmissive region which allows colored light having entered from the light source to be transmitted in every sub-pixel and to output the colored light to a viewer side and a reflective region which reflects light having entered through the coloring layer from the viewer side and outputs the colored light through the same coloring layer to the viewer side, wherein the reflective region is formed in a manner to correspond to the coloring layer and, therefore, at time of the reflective display operation, no parallax occurs and the transmissive region is not influenced at all by a color of the coloring layer which allows the coloring layer to be designed independently, thus enabling easy designing of the liquid crystal display device. Also, at the time of the transmissive display operation, light fed from the light source passes only through the transmissive region where no coloring layer is provided and, therefore, no light is absorbed by the coloring layer to allow all light to pass through the transmissived region, which makes it possible to make the most of high color purity of the light emitting element itself and which enables bright display and wide color reproducibility in the liquid crystal panel. As a result, luminance of the light source can be decreased and power consumption can be greatly reduced.

BRIEF DESCRIPTION OF THE DRAWINGS

The above and other objects, advantages, and features of the present invention will be more apparent from the following description taken in conjunction with the accompanying drawings in which:

FIG. 7 is a diagram showing states of data signals and displayed colors at time of the transmissive display operation used in the liquid crystal display shown in FIG. 1;

FIG. 8 is a diagram showing states of selecting signals, data signals, and LEDs (Light Emitting Diodes) at the time of the transmissive display operation, used in the liquid crystal display shown in FIG. 1;

FIG. 10 is a diagram showing states of selecting signals, data signals, and LEDs at the time of the reflective display operation is performed, used in the liquid crystal display shown in FIG. 1;

DETAILED DESCRIPTION OF THE PREFERRED EMBODIMENTS

Best modes of carrying out the present invention will be described in further detail using various embodiments with reference to the accompanying drawings. A liquid crystal display device is provided which has a semi-transmissive light reflecting plate provided outside of a liquid crystal panel and a data signal distributing unit to distribute and supply one kind of a data signal, as a sub-pixel data signal, to a data electrode selected based on a selecting signal corresponding to a successive additive color mixture process or juxtapositional additive color mixture process.

First Embodiment

Figure 1:
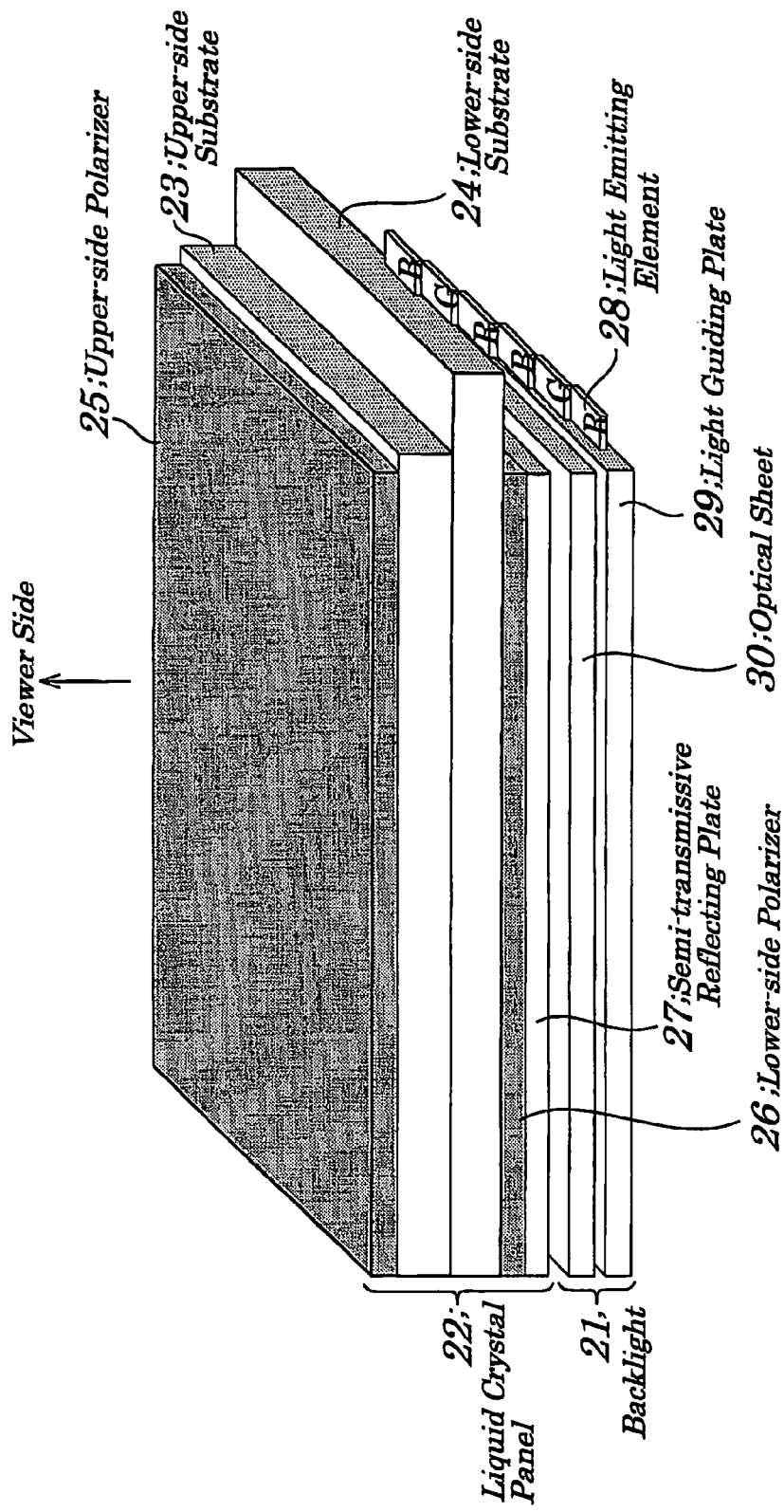
FIG. 1 is a perspective view showing configurations of main components making up a liquid crystal display device according to a first embodiment of the present invention.

FIG. 1 is a perspective view showing configurations of main components making up a liquid crystal display device of a first embodiment of the present invention. The liquid crystal display device of the first embodiment, as shown in FIG. 1, is made up of a backlight 21 and a liquid crystal panel 22. The liquid crystal panel 22 includes an upper-side substrate 23, a lower-side substrate 24, an upper-side polarizer 25, a lower-side polarizer 26, and a semi-transmissive reflecting plate 27. The upper-side substrate 23 and lower-side substrate 24 are made of a transparent substrate such as a glass, a transparent resin, or a like. The upper-side substrate 23 is formed on a visually-recognized side (viewer side) and the lower-side substrate 24 is formed on the backlight 21 side being opposite to the viewer side. The upper-side polarizer 25 is bonded to the viewer side of the upper-side substrate 23 and the lower-side polarizer 26 and the semi-transmissive reflecting plate 27 are bonded to a side being opposite to the viewer side of the lower-side substrate 24. The semi-transmissive reflecting plate 27 has a function of semi-transmissive reflection that is provided by a deposited film of aluminum, silver, and alloys of these metals, dielectric stacked film, or a film with a high refractive index such as a titanium oxide film. In the embodiment in particular, the semi-transmissive reflecting plate 27 is provided outside of the liquid crystal panel 22 and on a side opposite to the viewer side and allows colored light entering from the backlight 21 to pass through the semi-transmissive reflecting plate 27 and outputs the colored light to the viewer side and reflects light entering through the liquid crystal panel 22 from the viewer side and outputs the light to the viewer side.

The backlight 21 is provided on a side opposite to the viewer side of the liquid crystal panel 22 and includes light emitting elements 28, a light guiding plate 29, and an optical sheet 30. The light emitting elements 28 are made up of LEDs (Light Emitting Diodes) or a like and emit colored light corresponding to one of three primary colors of R (red), G (green), and B (blue). The light guiding plate 29 guides light emitted from the light emitting elements 28 toward the liquid crystal panel 22. The optical sheet 30 diffuses light which has been guided from the light guiding plate 29 to the liquid crystal panel 22.

Figure 2:
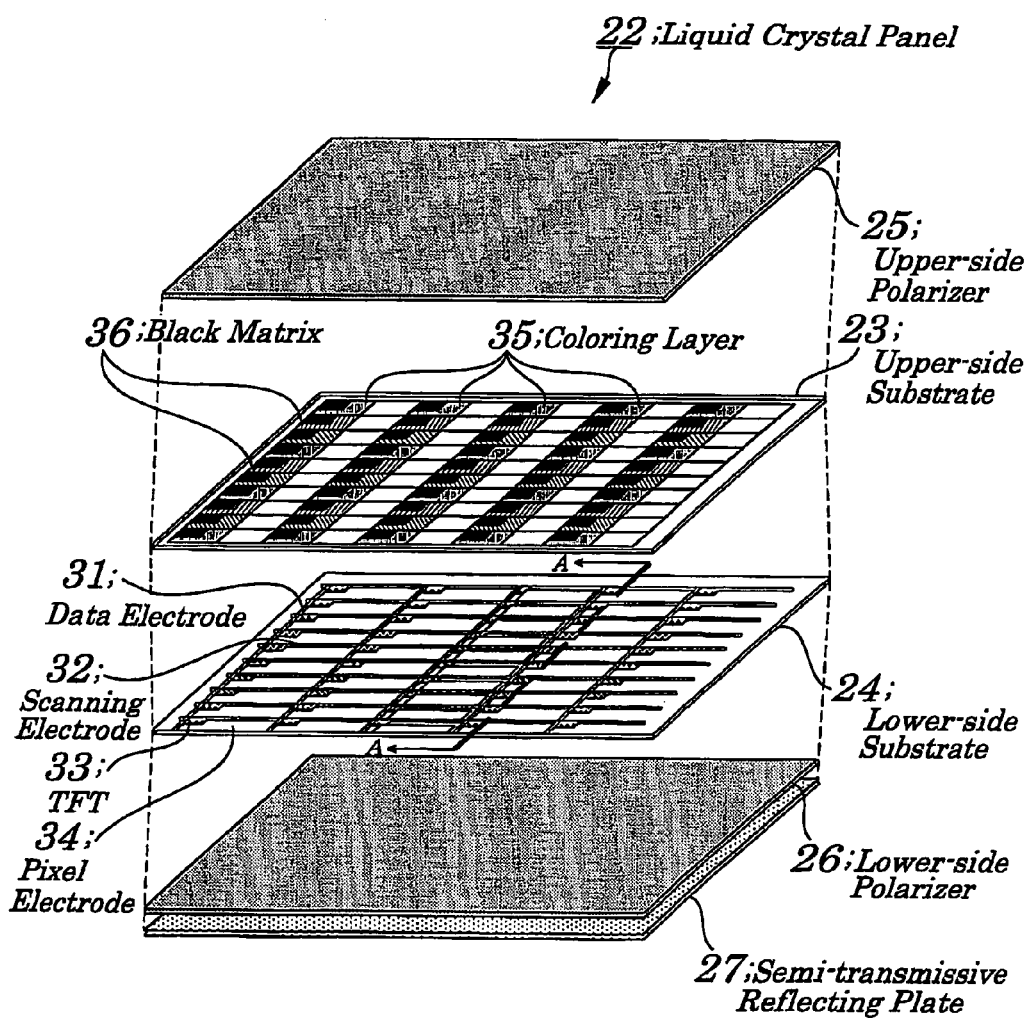
FIG. 2 is an exploded perspective view showing configurations of main components making up a liquid crystal panel shown in FIG. 1.

FIG. 2 is an exploded perspective view showing configurations of main components making up the liquid crystal panel 22 shown in FIG. 1. In the liquid crystal panel 22, as shown in FIG. 2, a plurality of data electrodes 31, a plurality of scanning electrodes 32, a plurality of TFTs 33, and a plurality of pixel electrodes 34 are formed on the lower-side substrate 24. The data electrodes 31 are formed at predetermined intervals in a first direction and input a sub-pixel data signal corresponding to each sub-pixel obtained by dividing each pixel into three portions each emitting one of the three colors of R, G, and B. The scanning electrodes 32 are formed at predetermined intervals in a second direction orthogonal to the first direction to input a scanning signal. Each of the pixel electrodes 34 is connected to the data electrode 31 via the TFT 33. The pixel electrodes 34 are made of a transparent conductive material such as ITO (Indium Tin Oxide) or NESA (Tin Oxide) film. On the lower-side substrate 24 is formed a terminal for external connection (not shown). The terminal for external connection inputs a sub-pixel data signal to the data electrodes 31 and a scanning signal to the scanning electrodes 32. To the terminal for external connection is connected a driving circuit (not shown) to drive the liquid crystal panel 22.

Moreover, on the upper-side substrate 23 are formed coloring layers 35 and a black matrix 36. The coloring layers 35 are made up of pigment-dispersed type resins each being colored in R, G, or B and the three portions each being colored in R, G, or B are adjacent to one another and makeup one pixel. The coloring layers 35 are so formed as to have a color corresponding to one of the primary three colors, R, G, and B, in a manner to correspond to part of each pixel cell. The coloring layers 35 are so colored as to correspond to each color to be applied at time of a reflective display operation in which light passes through the coloring layers 35 twice; however, when light from the light emitting elements 28 passes through all pixel cells once, at least 30% or more of light having passed through all the pixel cells is allowed to be transmitted through the coloring layers 35. The black matrix 36 is formed on part of each pixel cell and prevents light leakage caused by a leakage electric field or light leakage from the TFTs 33. In the liquid crystal panel 22 of the embodiment, by supply of a sub-pixel data signal to a pixel cell selected by a scanning signal out of pixel cells, light fed from the viewer side or from the backlight 21 is modulated in a manner to correspond to an image to be displayed.

Figure 3:
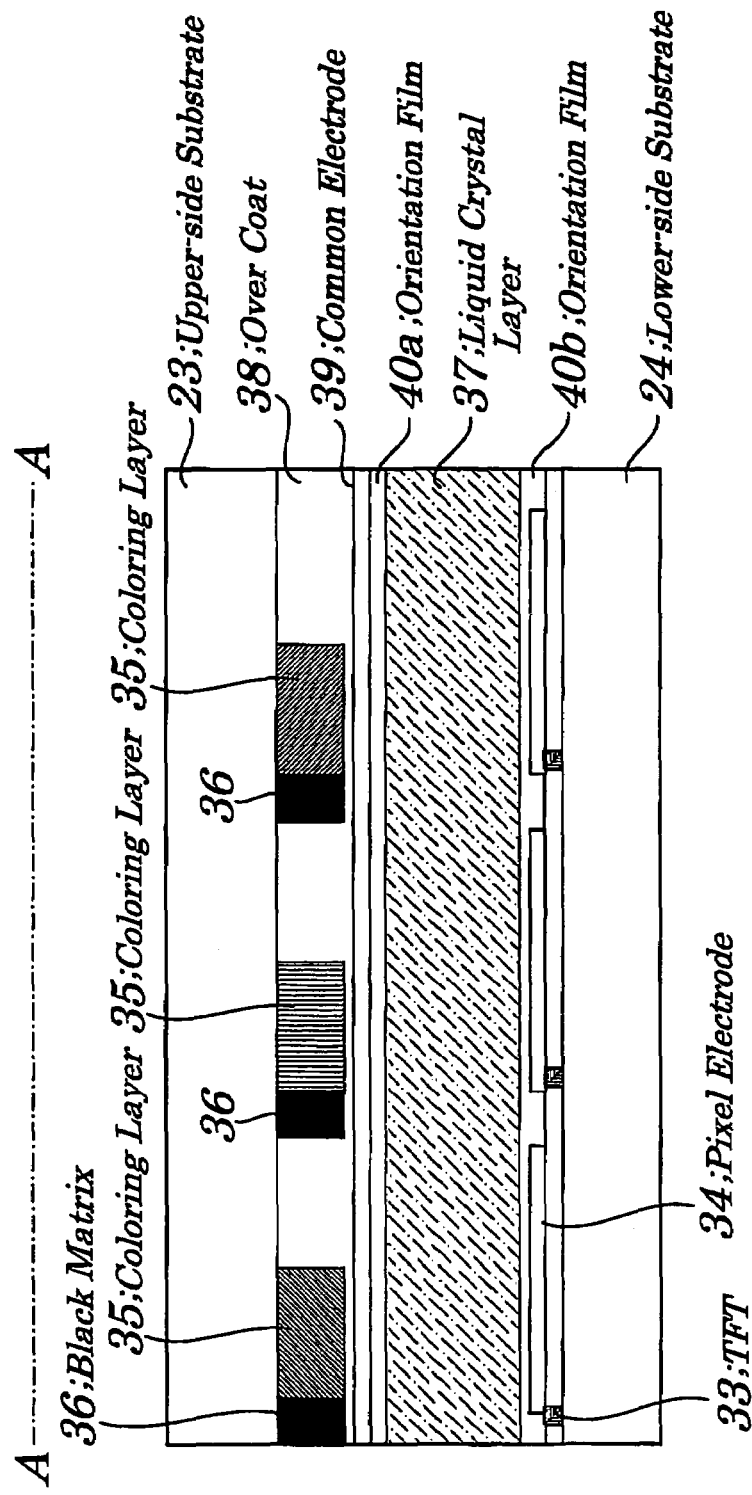
FIG. 3 is a cross-sectional view of the liquid crystal panel of FIG. 2 taken along a line A-A.

FIG. 3 is a cross-sectional view of the liquid crystal panel of FIG. 2 taken along a line A-A. As shown in FIG. 3, a liquid crystal layer 37 is sandwiched between the upper-side substrate 23 and lower-side substrate 24 and, in order to flatten a surface of the liquid crystal layer 37 on the upper-side substrate 23, an over coat 38 made of a transparent resin or a like is stacked in layers and, moreover, a common electrode 39 made of a transparent conductive material is stacked in layers.

The common electrode 39 is connected to a common wiring (not shown) on the lower-side substrate 24 via a conductive material such as a gold ball (ball grid array) or silver paste. Moreover, the common electrode 39 is connected to a terminal for external connection via a routing wiring. Based on a potential difference between the common electrode 39 and each pixel electrode 34, the liquid crystal layer 37 is controlled. On the uppermost surface on the liquid crystal layer 37 side of the upper-side substrate 23 and lower-side substrate 24, orientation films 40a and 40b to control orientation of a liquid crystal are formed. Furthermore, many spacers (not shown) (for example, spherical spacers or columnar spacers) are inserted in the liquid crystal layer 37 to uniform a clearance between the upper-side substrate 23 and lower-side substrate 24.

Figure 4:
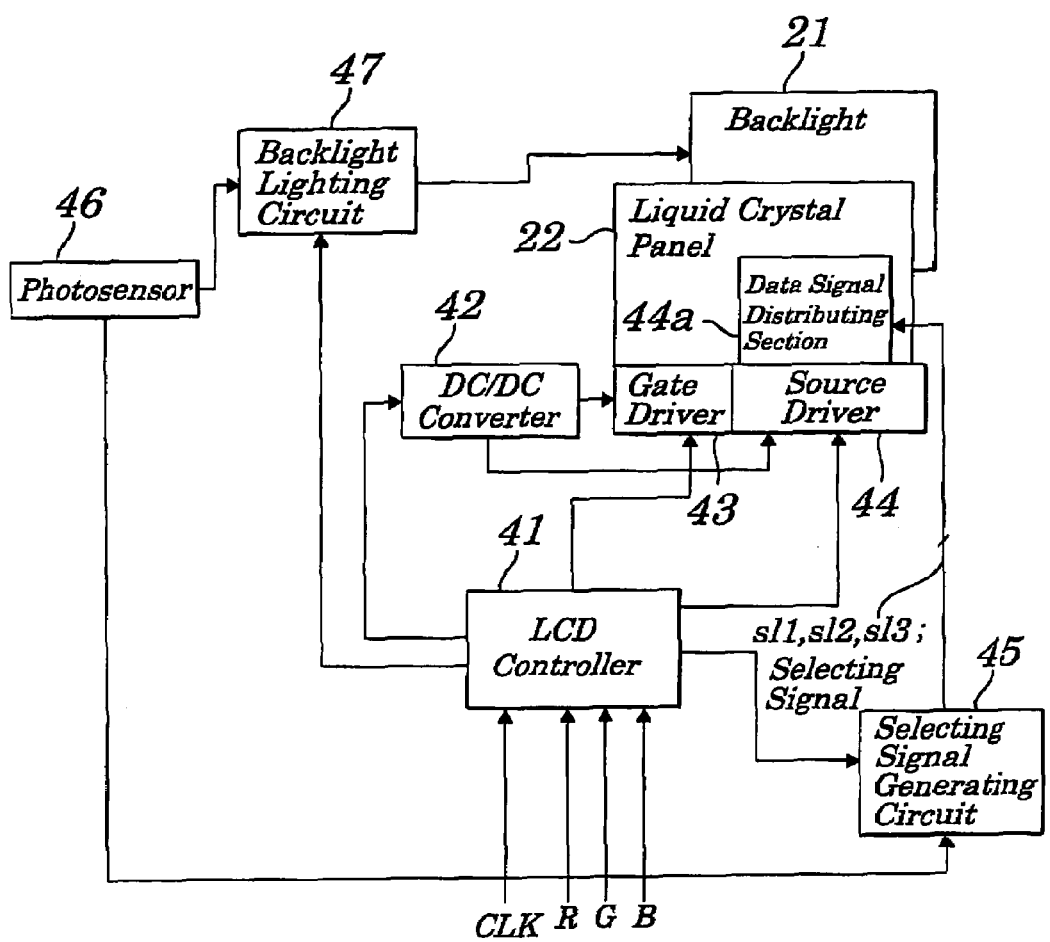
FIG. 4 is a schematic block diagram showing electrical configurations of the liquid crystal display device using a backlight and liquid crystal panel shown in FIG. 1.

FIG. 4 is a schematic block diagram showing electrical configurations of the liquid crystal display device using the backlight 21 and liquid crystal panel 22 shown in FIG. 1. The liquid crystal display device, as shown in FIG. 4, includes, in addition to the backlight 21 and liquid crystal panel 22, an LCD (Liquid Crystal Display) controller 41, a DC (Direct Current)/DC converter 42, a gate driver 43, a source driver 44, a selecting signal generating circuit 45, a photosensor 46, and a backlight lighting circuit 47. The photosensor 46 outputs a bright/dark judging signal depending on variations of environmental bright and dark states (that is, light emitting state and no light emitting state). The LCD controller 41 controls the DC/DC converter 42, gate driver 43, source driver 44, selecting signal generating circuit 45, and backlight lighting circuit 47, based on fed video signals of R, G, and B colors and a clock CLK. In the embodiment in particular, at time of a transmissive display operation, a color display is performed according to the successive additive color mixture process by dividing one frame into three fields and by driving the liquid crystal panel 22 in every field and by turning ON each of the light emitting elements including one emitting R light, another emitting G light and another emitting B light, sequentially in terms of time, in synchronization with timing of driving the liquid crystal panel 22, whereas, at time of the reflective display operation, a color display is performed according to the juxtapositional additive color mixture process by driving the liquid crystal panel in every one frame and by using light passing through the (three-color: red, green, and blue) coloring layers 35.

The selecting signal generating circuit 45 generates selecting signals s11, s12, and s13 to select the data electrodes 31 of the liquid crystal panel 22 corresponding to either of the successive additive color mixture process or juxtapositional additive color mixture process, based on a bright/dark judging signal fed from the photosensor 46 and on control by the LCD controller 41. The source driver 44 supplies a sub-pixel data signal to the liquid crystal panel 22 according to control of the LCD controller 41 and, in the embodiment in particular, has a data signal distributing section 44a which distributes and supplies one kind of data signal, as a sub-pixel data signal, to the data electrodes 31 selected, based on the selecting signals s11, s12, and s13 each corresponding to either of the successive additive color mixture process or juxtapositional additive color mixture process. The backlight lighting circuit 47, when a bright/dark judging signal fed from the photosensor 46 indicates "a dark state", turns ON the backlight 21 according to control of the LCD controller 41 in a manner to correspond to either of the successive additive color mixture process or juxtapositional additive color mixture process and, when the judging signal indicates "a bright state", turns OFF the backlight 21. The DC/DC converter 42 supplies power to the gate driver 43 and the source driver 44 according to control by the LCD controller 41. The gate driver 43 supplies a scanning signal to the liquid crystal panel 22 according to control by the LCD controller 41.

Figure 5:
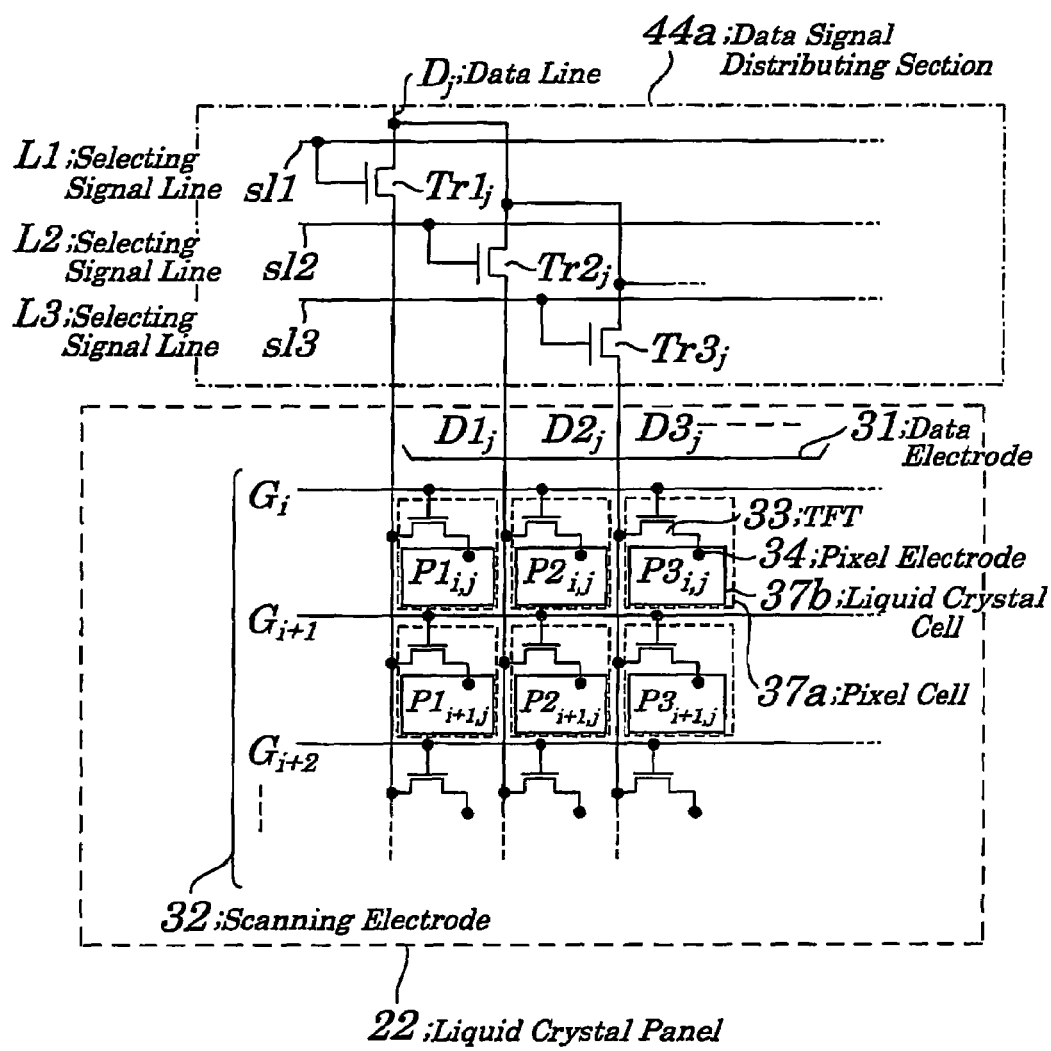
FIG. 5 is a schematic diagram for showing electrical configurations of main components making up a data signal distributing section contained in a source driver and the liquid crystal panel shown in FIG. 4.

FIG. 5 is a schematic diagram showing electrical configurations of main components making up the data signal distributing section 44a contained in the source driver 44 and the liquid crystal panel 22 shown in FIG. 4. The data signal distributing section 44a is made up of selecting signal lines L1, L2, and L3 and transistors Tr1j, Tr2j, and Tr3j ("j" is the number of pixels in a first direction). The transistors Tr1j, Tr2j, and Tr3j are controlled ON/OFF based on the selecting signals s11, s12, and s13 to be input to the selecting signal lines L1, L2, and L3 and distributes and supplies one kind of data signal input, as a sub-pixel data signal, from a data line Dj to the data electrode 31 selected based on the selecting signals s11, s12, and s13 each corresponding to either of the successive additive color mixture process or juxtapositional additive color mixture process. In the first embodiment in particular, the transistors Tr1j, Tr2j, and Tr3j, at time of the transmissive display operation, simultaneously select the data electrode 31 corresponding to three sub-pixels making up each pixel, based on the selecting signals s11, s12, and s13 corresponding to the successive additive color mixture process, whereas the transistors Tr1j, Tr2j, and Tr3j, at time of the reflective display operation, select the data electrode 31 corresponding to a color of the coloring layer 35, based on selecting signals s11, s12, and s13 corresponding to the juxtapositional additive color mixture process.

In the liquid crystal panel 22, pixel cells 37a are formed in regions of intersections of each of the data electrodes 31 (D1j, D2j, and D3j, . . .) and each of the scanning electrodes 32. Each of the pixel cells 37a is made up of one TFT 33, one pixel electrode 34, and one liquid crystal cell 37b (P1$_{i,j}$, P2$_{i,j}$, and P3$_{i,j}$, "j" denotes the number of pixels in a first direction, and "i" denotes the number of pixels in a second direction).

Figure 6:
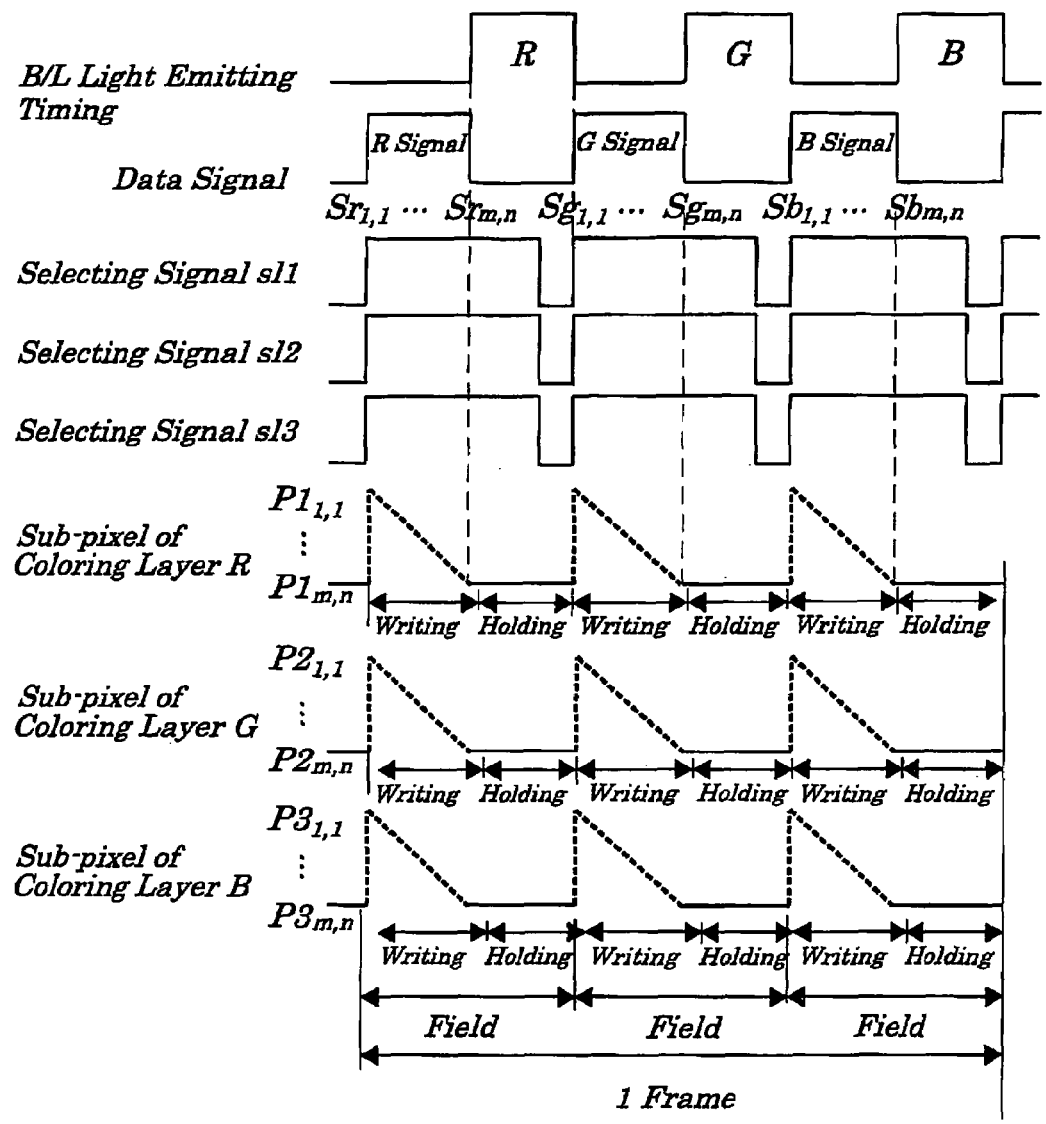
FIG. 6 is a time chart explaining a driving method to be employed when a transmissive display operation is performed, used in the liquid crystal display shown in FIG. 1.
Figure 9:
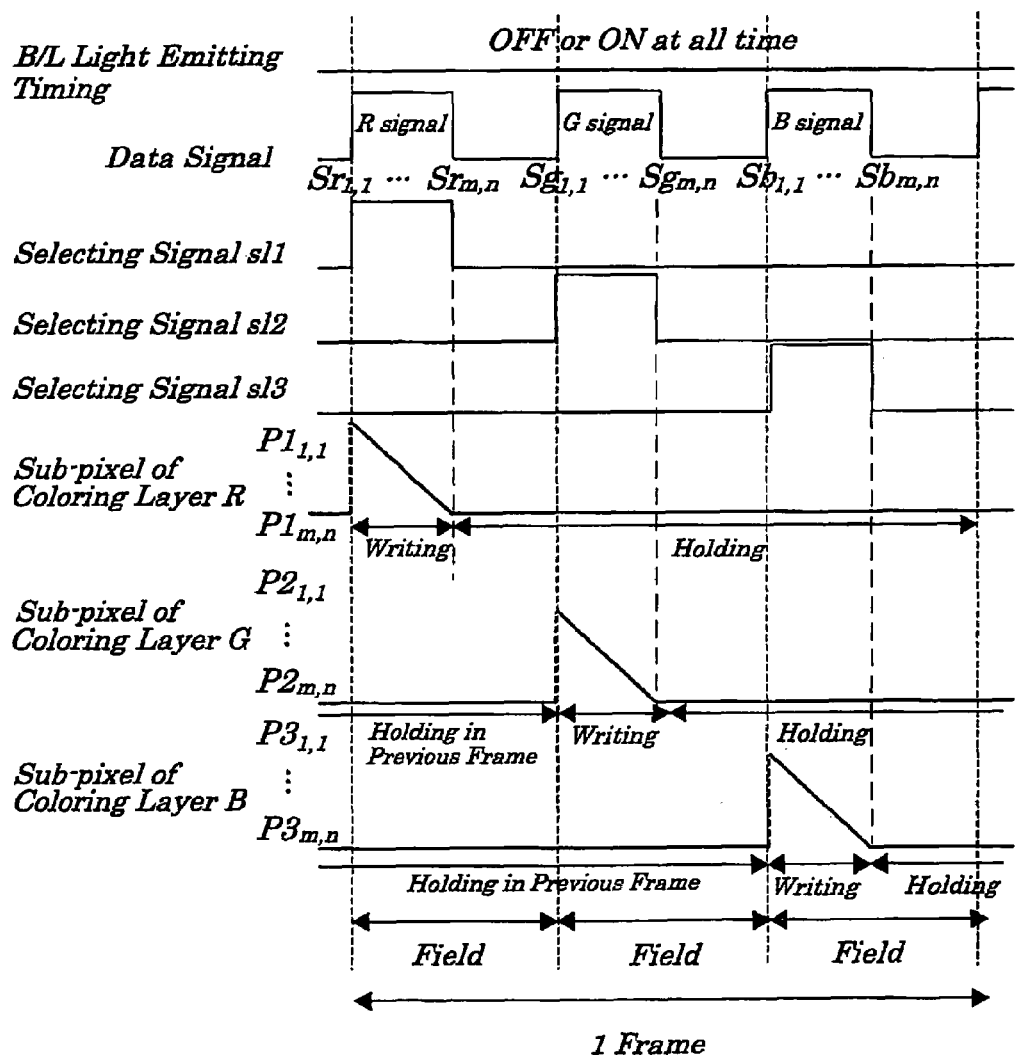
FIG. 9 is a time chart explaining a driving method to be applied when a reflective display operation is performed, used in the liquid crystal display shown in FIG. 1.
Figure 11:
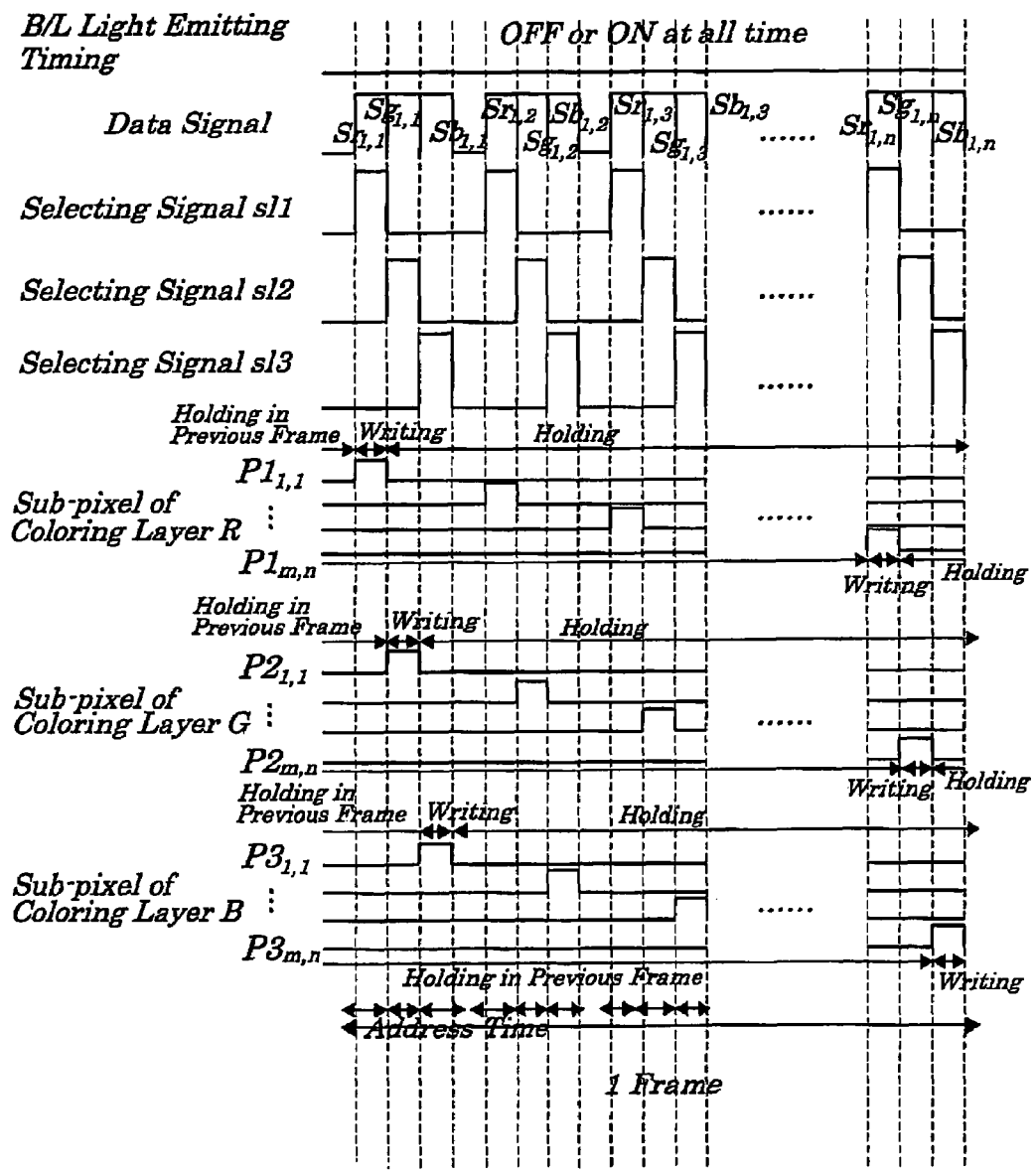
FIG. 11 is a time chart explaining another driving method to be applied when the reflective operation is performed.

FIG. 6 is a time chart explaining a driving method to be employed when the transmissive display operation is performed in the liquid crystal display shown in FIG. 1. FIG. 7 is a diagram showing states of data signals and displayed colors at time of the transmissive display operation in the liquid crystal display shown in FIG. 1. FIG. 8 is a diagram showing states of selecting signals, data signals, and LEDs at the ti me of the transmissive display operation in the liquid crystal display shown in FIG. 1. FIG. 9 is a time chart explaining a driving method to be applied when a reflective display operation is performed in the liquid crystal display shown in FIG. 1. FIG. 10 is a diagram showing states of selecting signals, data signals, and LEDs at the time of the reflective display operation in the liquid crystal display shown in FIG. 1. FIG. 11 is a time chart explaining another driving method to be applied when the reflective operation is performed. By referring to these drawings, contents of processing in the driving method to be applied to the liquid crystal display device of the embodiment are described. In the liquid crystal display device of the embodiment, when the transmissive display operation is performed, one frame is divided into three fields and the liquid crystal panel 22 is driven in every field and the light emitting elements 28 including one emitting R light, another emitting G light, and another emitting B light are turned ON, sequentially in terms of time, in synchronization with timing of driving the liquid crystal panel 22 to perform a color display operation according to the successive additive color mixture method, that is, to perform the FS driving operation. When the reflective display operation is performed, the liquid crystal panel is driven in every one frame and a color display operation is performed by light passing through the three-color coloring layers 35 according to the juxtapositional additive color mixture method; that is, a CF (Color Filter) driving operation is performed.

In other words, when the FS driving operation is performed, as shown in FIG. 6, each of the selecting signals s11, s12, and s13 corresponding to the successive additive color mixture process is put into an active mode (high level, "H") and the transistors Tr1, Tr2, and Tr3 are put into an ON state and the data electrodes 31 corresponding to the three sub-pixels (pixel cell 37a) making up each pixel are simultaneously selected and the same data signals are input. Next, one frame is divided into three fields and R (red) data signals $S_{r1,1}, \ldots, S_{rm,n}$, G (green) data signals $S_{g1,1}, \ldots, S_{gm,n}$ and B(blue) data signals $S_{b1,1}, \ldots, S_{bm,n}$ are supplied sequentially in terms of field time. These data signals are written to each sub-pixel of the liquid crystal panel 22 (pixel cell 37a) $P1_{1,1}, \ldots, P1_{m,n}, P2_{1,1}, \ldots, P2_{m,n}, P3_{1,1}, \ldots, P3_{m,n}$ and are held and, as shown in FIG. 8, the light emitting elements (LED) 28 including one emitting R light, another emitting G light, and another emitting B light are turned ON, sequentially in terms of time, in synchronization with timing of switching, sequentially in terms of time, between a bright state (light emitting state) and a dark state (no-light emitting state) to perform a display operation.

For example, when red is displayed in one frame, as shown in FIG. 7, in a field during which the (red) light emitting element 28 is turned ON, the data signal $S1_{i,j}$ is supplied so that a corresponding sub-pixel is put into a bright state (light emitting state) and, in a field during which the (green and blue) light emitting elements 28 are turned ON, the data signals $S2_{i,j}$ and $S3_{i,j}$ are supplied so that a corresponding sub-pixel is put into a dark state. As a result, only red light passes through the liquid crystal panel 22 and red is displayed. When the (red) light emitting element 28 is turned ON, even if light passes through the green or blue sub-pixel (pixel cell 37a), light other than red light is not emitted. Moreover, to display a green or blue, a data signal is supplied in a way similar to the above, so that, only in a field during which the (green) light emitting element 28 is turned ON, a corresponding sub-pixel is put into a bright state and, in fields other than the above, the corresponding sub-pixel is put into a dark state and, only in a field during the blue light emitting element 28 is turned ON, a data signal is supplied so that a corresponding sub-pixel is put into a bright state and, in fields other than the above, the data signal is supplied so that the corresponding sub-pixel is put into a dark state, thus, making it possible to display each color.

To display white in one frame, data signals $S1_{i,j}$, $S2_{i,j}$, and $S3_{i,j}$ are supplied in a field during which each of the (R, G, and B) light emitting elements 28 including one emitting R, another emitting G, and another emitting B, is turned ON so that each of the corresponding sub-pixels is put into a bright state and the (R, G, and B) light is emitted simultaneously and a white is displayed according to a principle of the additive color mixture. Moreover, if data signals $S1_{i,j}$, $S2_{i,j}$, and $S3_{i,j}$ are supplied so that each of the sub-pixels is put into a dark state, a black is displayed. Furthermore, when the light emitting elements 28 having a plurality of color components are selected and simultaneously turned ON, displaying of other colors (magenta, white, yellow, or cyan) is performed accordingly.

Also, in the CF driving, display is achieved by individually driving the red sub-pixel, green sub-pixel, and blue sub-pixel. For example, to display red, as shown in FIG. 9, by putting only the selecting signal s11 corresponding to a color of the coloring layer 35, out of the selecting signals s11, s12, and s13 corresponding to the juxtapositional additive color mixture process, into an active mode (high level, "H") and by putting other selecting signals (for green and blue) into a non-active mode (low level, "L"), the data electrode 31 corresponding to a color of the coloring layer 35 is selected and red data signals $S_{r1,1}, \ldots, S_{rm,n}$, are written only to the red sub-pixels $P1_{1,1}, \ldots, P1_{m,n}$. Furthermore, to display green or blue, similarly, by putting the selecting signal s12 and s13 into an active mode, the green data signals $S_{g1,1}, \ldots, S_{gm,n}$ or blue data signals $S_{b1,1}, \ldots, S_{bm,n}$ are written to the green sub-pixels $P2_{1,1}, \ldots, P2_{m,n}$, or blue data signals $P3_{1,1}, \ldots, P3_{m,n}$.

In this case, one frame is divided into three fields and the R, G, and B data signals $S_{r1,1}, \ldots, S_{rm,n}, S_{g1,1}, \ldots, S_{gm,n}$ and $S_{b1,1}, \ldots, S_{bm,n}$ are supplied, sequentially in terms of every field time, to the data electrode 31 and these data signals are written to each sub-pixel (pixel cell 37a) and held therein. At this time point, as shown in FIG. 10, the light emitting elements 28 including one emitting R light, another emitting G light, and another emitting B light are in a non-light emitting state (in an OFF state).

For example, to display red in one frame, a data signal is supplied so that a red sub-pixel is put into a bright state and so that green and blue sub-pixels are put into a dark state. To display green, similarly, a data signal is supplied so that a green sub-pixel is put into a bright state and so that red and blue sub-pixels are put into a dark state. To display blue, a data signal is supplied so that a blue sub-pixel is put into a bright state and so that red and green sub-pixels are put into a dark state, accordingly.

To display white, a data signal is supplied so that each of the red, green, and blue sub-pixels is put into a bright state which displays a red, green, and blue at the same time and, therefore, white is displayed according to a principle of additive color mixture. Also, by supplying a data signal so that each of the red, green, blue sub-pixels is put into a dark state, black is displayed. Moreover, when a data signal is supplied so that a plurality of sub-pixels out of the red, green, and blue sub-pixels is put into a bright state, other colors (magenta, white, yellow, or cyan) are displayed.

At the time of reflective display, as shown in FIG. 11, displaying can be achieved by inputting a data signal to each sub-pixel sequentially. In this case, addition of a circuit to generate a data signal is required.

As described above, in the first embodiment, since the semi-transmissive reflecting plate 27 is formed outside of the liquid crystal panel 22, it is possible to reduce a series of complicated processes including stacking of a reflecting plate in layers, coating of a resist, exposure of patterns, development, etching on the reflecting plate, peeling of a resist, and cleaning. The liquid crystal display device of the first embodiment requires no retardation plate, which enables the use of materials to be reduced and configurations of the liquid crystal panel 22 to be simple. Also, since the semi-transmissive reflecting plate 27 is formed outside of the lower-side polarizer polarizer 26, the defective lower-side polarizer polarizer 26 and semi-transmissive reflecting plate 27 caused by the semi-transmissive reflecting plate 27 can be changed easily, which can improve yields. Furthermore, since the data signal distributing section 44a is provided which distributes and supplies one kind of data signal, as a sub-pixel data signal, to the data electrode 31 selected based on selecting signals s11, s12, and s13 corresponding to the successive additive color mixture process or juxtapositional additive color mixture process, a circuit to generate a data signal corresponding to FS driving, transmissive display, and reflective display is not required, which makes configurations of the liquid crystal display device be more simple.

Second Embodiment

Figure 12:
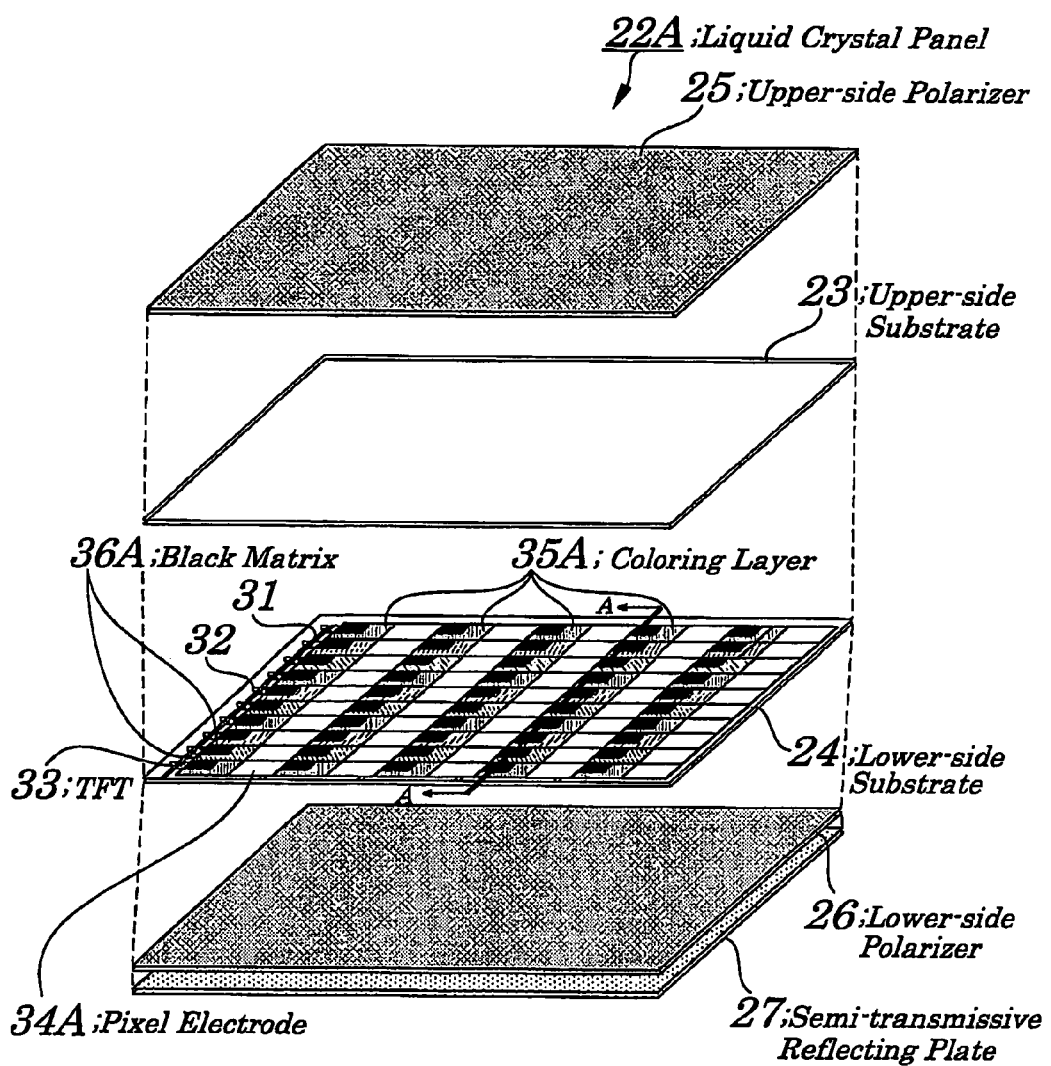
FIG. 12 is an exploded perspective view showing configurations of main components making up a liquid crystal display device according to a second embodiment of the present invention.

FIG. 12 is an exploded perspective view showing configurations of main components making up a liquid crystal display device according to a second embodiment of the present invention and same reference numbers are assigned to components having the same function of those shown in FIG. 2 of the first embodiment. A liquid crystal panel 22A of the second embodiment, as shown in FIG. 12, has plurality kinds of coloring layers 35A and an element of black matrix 36A formed on each of TFTs 33 on a lower-side substrate 24 and of a COT (Color Filter on TFT) structure. Configurations other than the above are the same as shown in FIG. 2.

Figure 13:
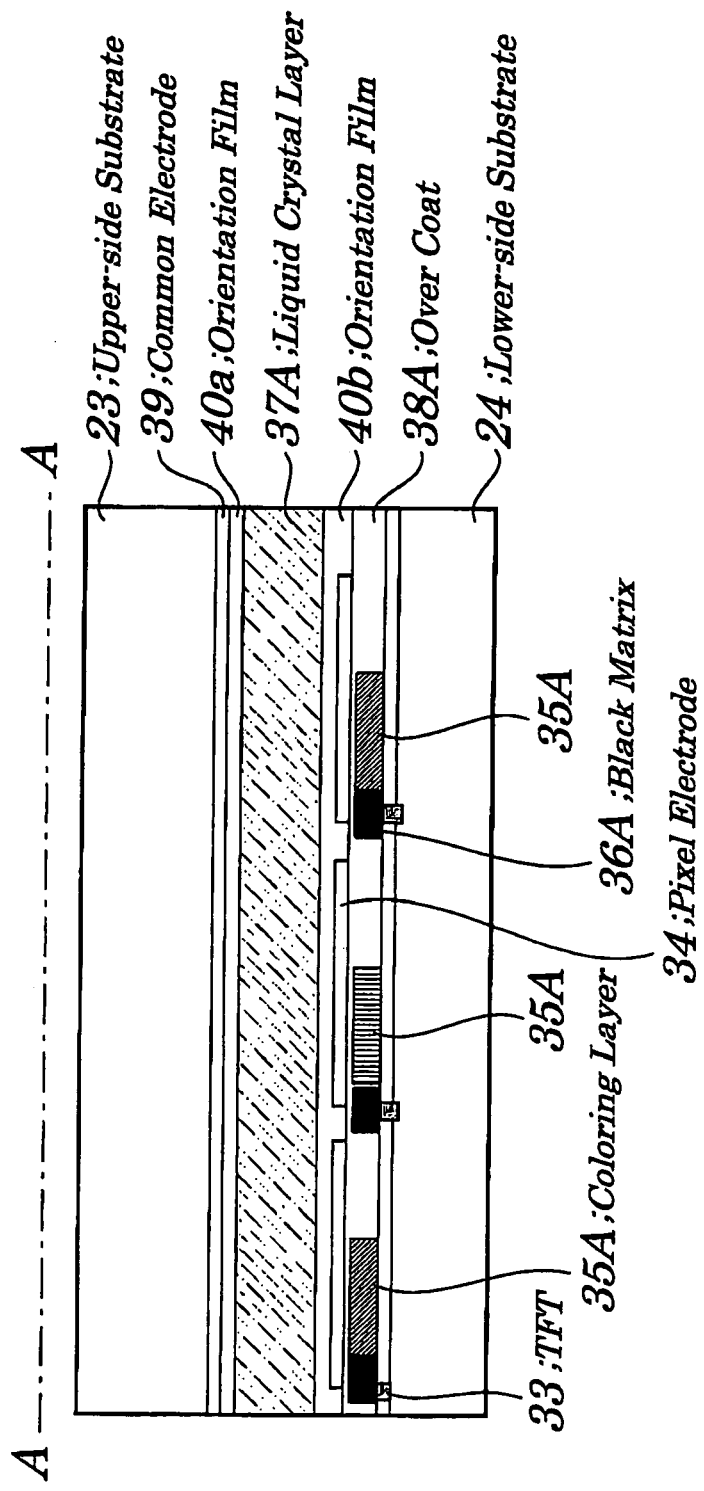
FIG. 13 is a cross-sectional view of a liquid crystal panel of FIG. 12 taken along a line A-A.

FIG. 13 is a cross-sectional view of the liquid crystal panel of FIG. 12 taken along a line A-A. As shown in FIG. 13, a liquid crystal layer 37 is sandwiched between the upper-side substrate 23 and lower-side substrate 24 and, on the coloring layer 35A and elements of a black matrix 36A on the lower-side substrate 24 is stacked an over coat 38A in layers to achieve a flattened surface. On the over coat 38A is formed a pixel electrode 34. The pixel electrode 34 is connected to the TFT 33 via a contact hole (not shown) of the over coat 38A. Moreover, the TFT 33 is formed on the lower-side substrate 24 and, therefore, only the common electrode 39 is stacked in layers on the upper-side substrate 23. The upper-side substrate 23 is made up of a thin plastic substrate.

The liquid crystal panel 22A according to the second embodiment is driven by the same driving method as employed in the first embodiment and has the same advantages as the first embodiment and, in addition, the liquid crystal panel 22A is of a COT structure and, therefore, pixels are packed at a density being 202 ppi (pixel per inch) that excel a human's visual resolution, thus making it possible to realize high-definition display. Moreover, the upper-side substrate 23 is constructed of a thin plastic substrate which enables the liquid crystal panel 22A easily to become lightweight and thin to a degree to which a mobile device, such as a portable phone or PDA, requires.

However, the liquid crystal display devices according to the first embodiment and the second embodiment each have a problem in that external light having entered the liquid crystal panel 22, 22A passes through the polarizers (an upper-side polarizer 25 and a lower-side polarizer 26) four times before the external light is reflected by a semi-transmissive reflecting plate 27 and is visually recognized and a distance between the semi-transmissive reflecting plate 27 and the liquid crystal layer 37, 37A is comparatively large and, therefore, parallax occurs which causes a decrease in viewability. In a following third embodiment, a liquid crystal display device to solve this problem is disclosed.

Third Embodiment

Figure 14:
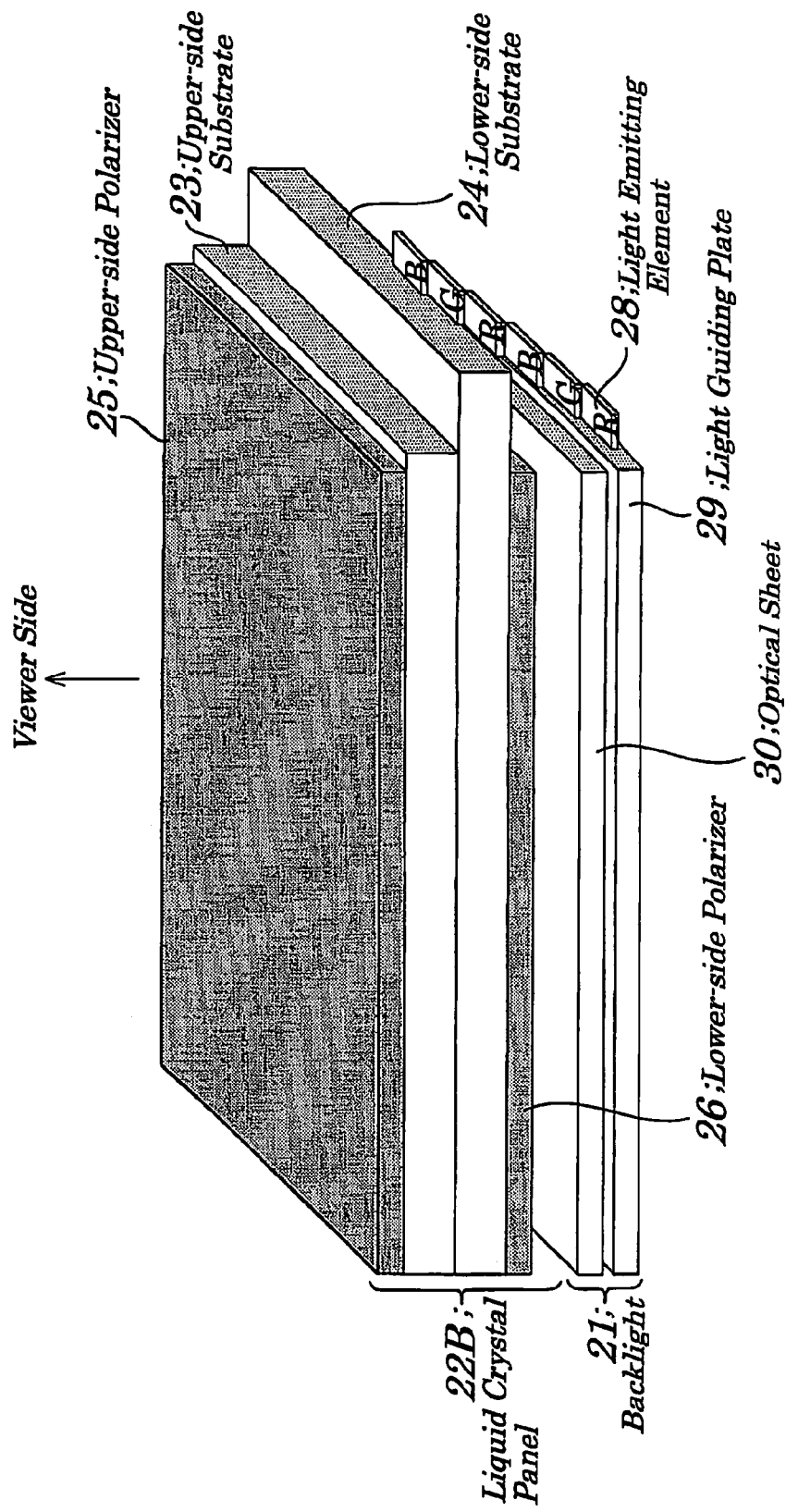
FIG. 14 is a perspective view showing configurations of main components making up a liquid crystal display device according to a third embodiment of the present invention.

FIG. 14 is a perspective view showing configurations of main components making up a liquid crystal display device according to the third embodiment of the present invention. In a liquid crystal display panel 22B of the third embodiment, as shown in FIG. 14, the liquid crystal panel 22B is provided which has configurations being different from those of the liquid crystal panel 22 shown in FIG. 1. In the liquid crystal panel 22B, a semi-transmissive reflecting plate 27 formed in the liquid crystal panel 22 of the first embodiment is omitted.

Figure 15:
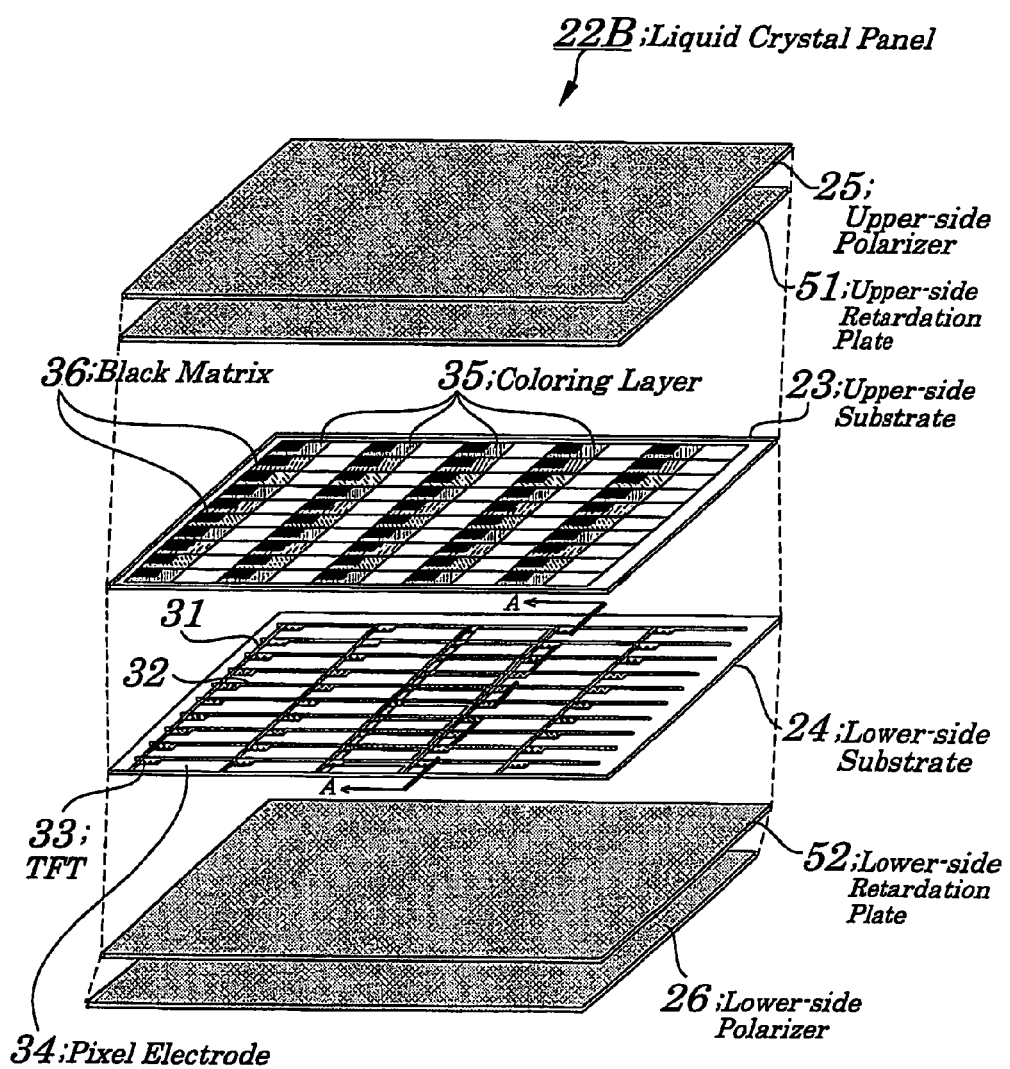
FIG. 15 is an exploded perspective view showing configurations of main components making up a liquid crystal panel shown in FIG. 14.

FIG. 15 is an exploded perspective view showing configurations of main components making up the liquid crystal panel 22B shown in FIG. 14. In the liquid crystal panel 22B, as shown in FIG. 15, between an upper-side polarizer 25 and an upper-side substrate 23 is interposed an upper-side retardation plate 51 and between a lower-side polarizer 26 and a lower-side substrate 24 is interposed a lower-side retardation plate 52.

Figure 16:
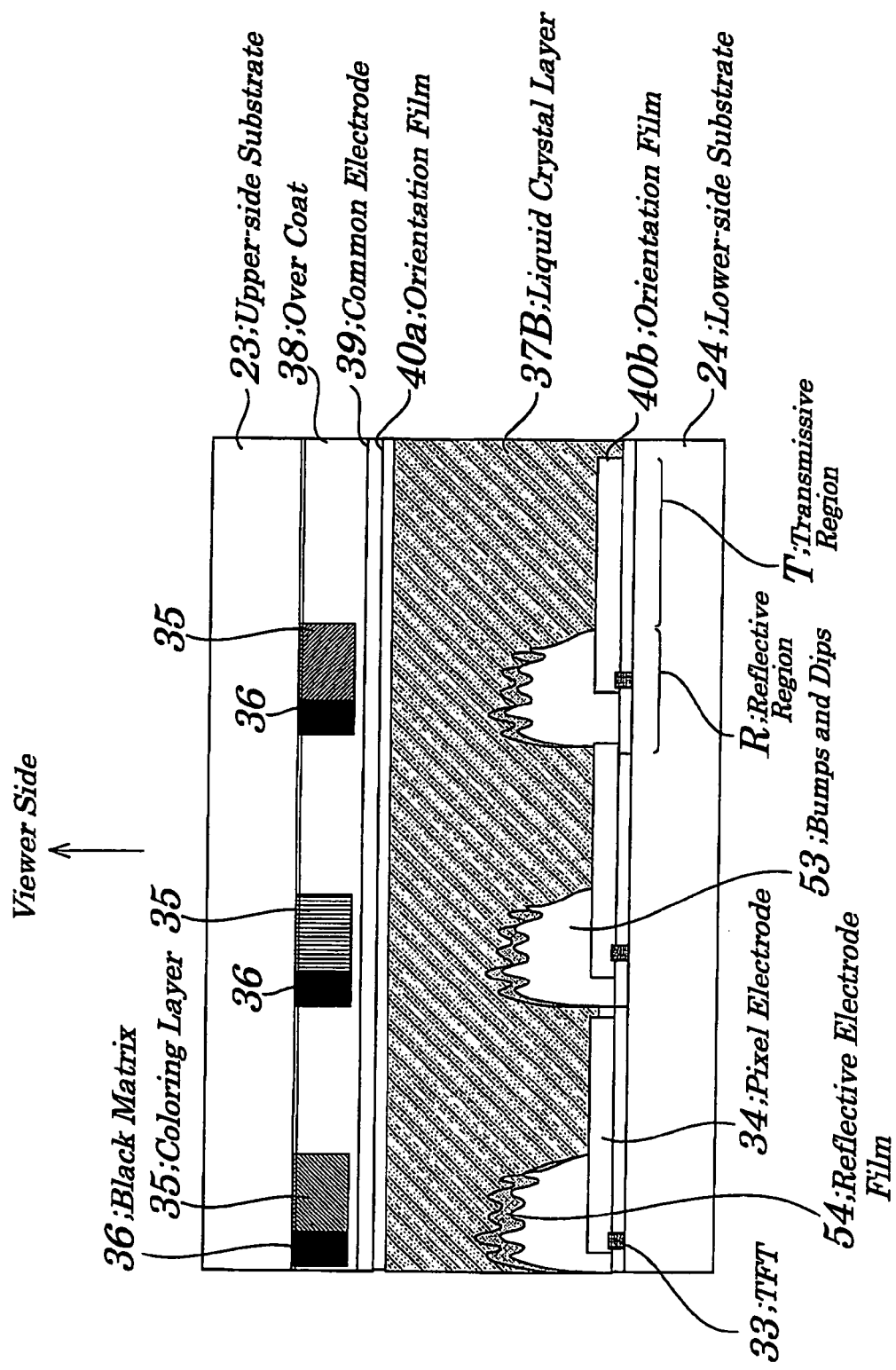
FIG. 16 is a cross-sectional view of the liquid crystal panel of FIG. 15 taken along a line A-A.
Figure 17:
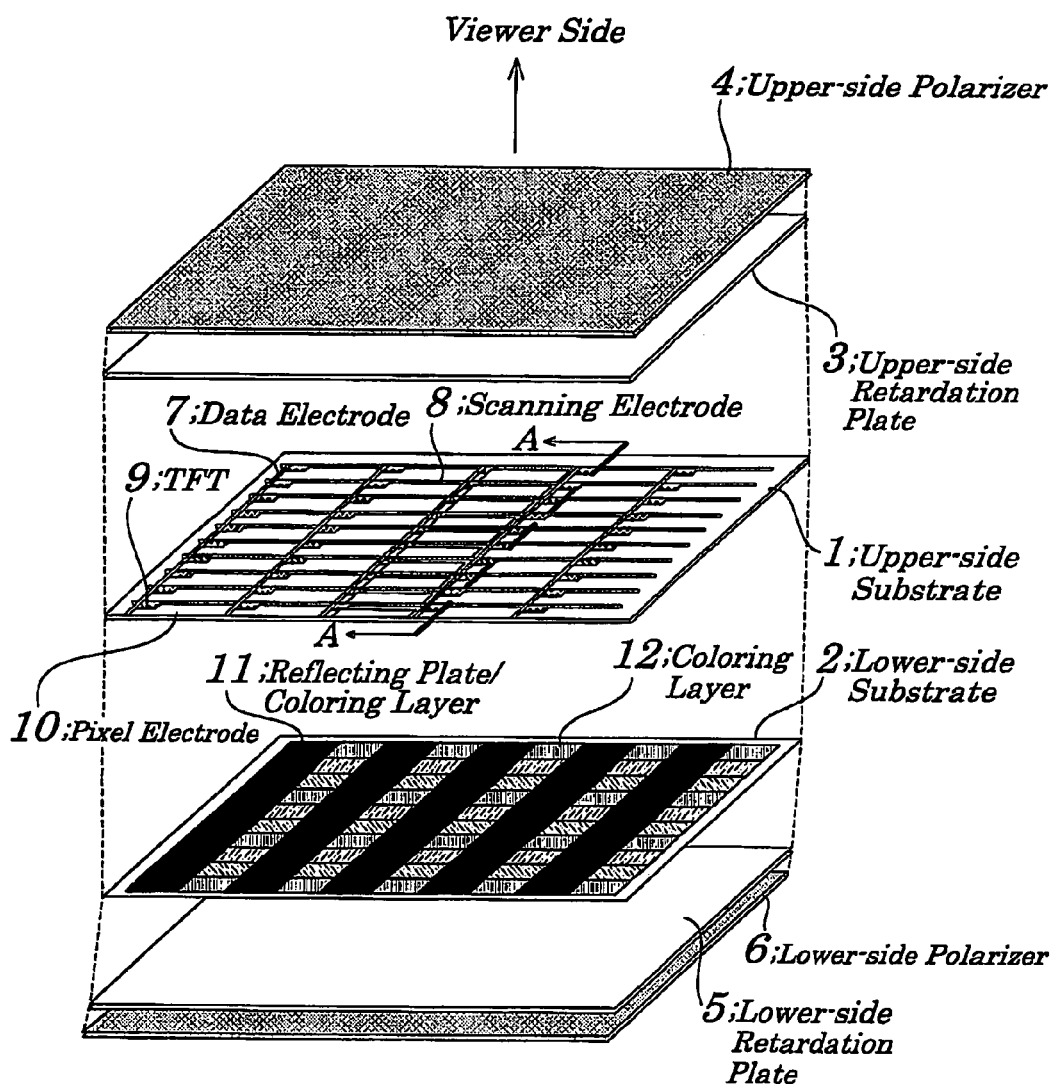
FIG. 17 is an exploded perspective view showing configurations of main components of a liquid crystal panel being used in a conventional liquid crystal display device.
Figure 18:
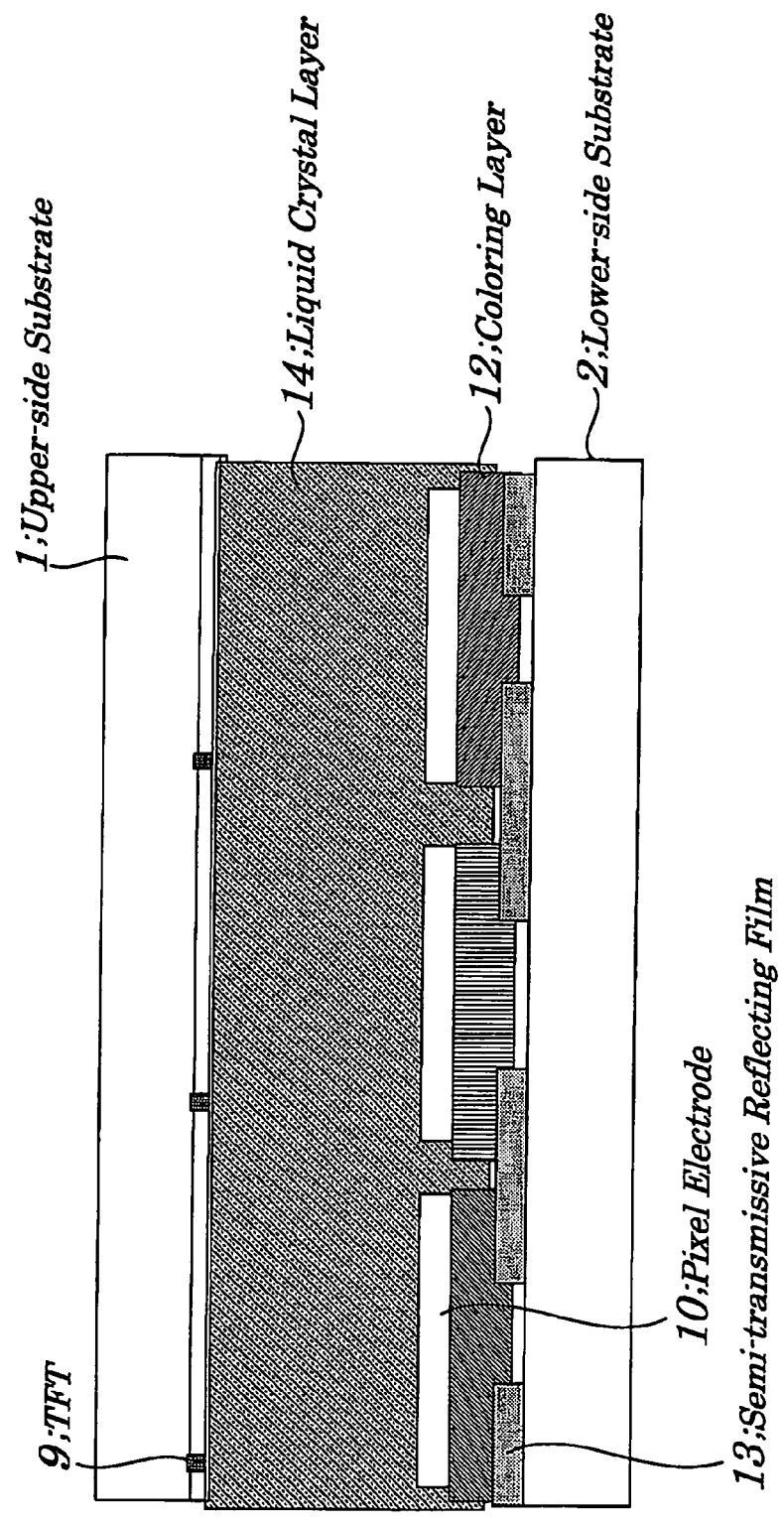
FIG. 18 is a cross-sectional view of the liquid crystal panel of FIG. 17 taken along a line A-A.

FIG. 16 is a cross-sectional view of the liquid crystal panel 22B of FIG. 15 taken along a line A-A. As shown in FIG. 16, between the upper-side substrate 23 and the lower-side substrate 24 is sandwiched a liquid crystal layer 37B having configurations being different from those of a liquid crystal layer 37 shown in FIG. 3. The liquid crystal layer 37B has transmissive regions T which allow colored light having entered from a backlight 21 to be transmitted in every sub-pixel and output the colored light to a viewer side and reflective regions R which reflect light having entered through coloring layers 35 from the viewer side and output the colored light through the coloring layers 35 to the viewer side. The reflective regions R are located in a manner to correspond to the coloring layers 35. In the reflective regions R, bumps and dips 53 to reflect external light to a targeted direction are formed in the liquid crystal layer 37B. On the bumps and dips 53 are formed reflective electrode films 54 made of aluminum, aluminum alloy, silver, silver alloy, or a like. The reflective electrode films 54 are connected directly or through pixel electrodes 34 to TFTs 33.

Figure 19:
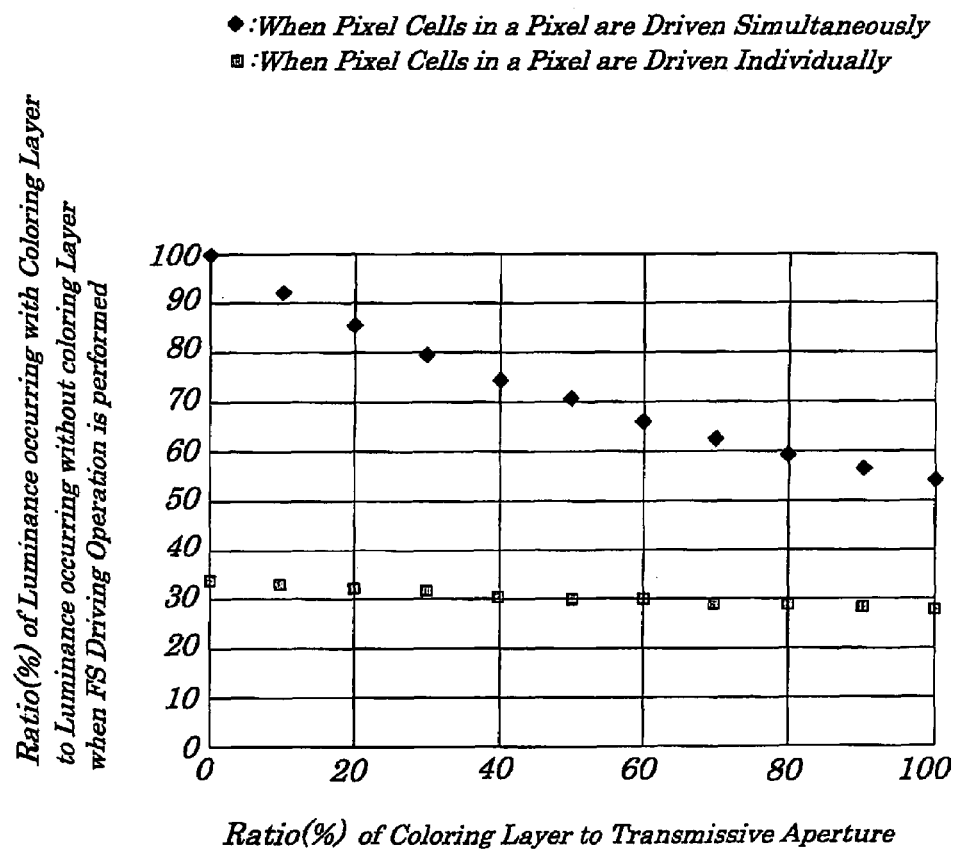
FIG. 19 is a diagram showing a relationship between a ratio of a coloring layer to a transmissive aperture and a ratio of luminance occurring when the coloring layer is used to luminance occurring when an FS driving operation is performed without using the coloring layer.

According to the liquid crystal display device of the third embodiment, since the reflective electrode films 54 are formed in a portion being very near to the liquid crystal layer 37B, at the time of the reflective display operation, the problem that viewability decreases due to the occurrence of parallax is solved. Moreover, the transmissive regions T are not influenced at all by a color of the coloring layers 35 and, therefore, the coloring layers 35 can be independently designed, thus enabling easy designing of the liquid crystal display device. At the time of the transmissive display operation, light passes sequentially through the lower-side polarizer 26 and the lower-side retardation plate 52 and passes only through the transmissive regions T where no coloring layers 35 are formed and, as a result, light is not absorbed by the coloring layers 35 to allow all rays to pass through the transmissvie regions T. Therefore, it is possible to make the most of high chromatic purity of light emitting elements 28 themselves, thus achieving bright displaying and wide color reproducibility. That is, as described in the conventional technology shown in FIG. 19, a ratio of an area of the coloring layers 35 to an area of the transmissive aperture is 0% which makes it possible to obtain luminance equivalent to the luminance obtained when FS driving using no coloring layer is performed. This enables luminance of the backlight 21 to be decreased and, thus, power consumption to be reduced greatly.

It is apparent that the present invention is not limited to the above embodiments but may be changed and modified without departing from the scope and spirit of the invention. For example, the reflecting plate formed in the backlight 21 may be used in place of the semi-transmissive reflecting plate 27 shown in FIG. 1. Also, a manual switch may be used instead of the photosensor 46 of the first embodiment (shown in FIG. 4). Furthermore, the data signal distributing section 44a of the first embodiment, as shown in FIG. 4, is contained in the source driver 44, however, may be embedded in the liquid crystal panel 22.

The present invention can be applied to the entire liquid crystal display device in which the transmissive display operation or reflective display operation is selectively performed.

What is claimed is:

1. A liquid crystal display device comprising:
a light source;
a liquid crystal panel; and
at least one driving circuit,
wherein said light source comprises:
three kinds of light emitting elements each emitting light corresponding to a color out of three colors of red, green, and blue;
wherein said liquid crystal panel comprises:
a plurality of data electrodes formed at predetermined intervals in a first direction to input a sub-pixel data signal to sub-pixels;
a plurality of scanning electrodes formed at predetermined intervals in a second direction orthogonal to said first direction to input a scanning signal;
a plurality of pixel cells formed in a region of intersections of each of said data electrodes and each of said scanning electrodes, said sub-pixels obtained by dividing each pixel into three regions corresponding to three colors of red, green, and blue; and
a semi-transmissive light reflecting plate,
wherein light fed from a viewer side or said light source is modulated in a manner to correspond to an image to be displayed by supply of said sub-pixel data signal to pixel cells selected by said scanning signal;
wherein three kinds of coloring layers each corresponding to one each of the three colors of red, green; and blue, are formed in part on each of the three sub-pixels;
wherein said semi-transmissive light reflecting plate allows colored light having entered from said light source to be transmitted and to output the colored light to the viewer side, to reflect light having entered through said coloring layer from the viewer side, to output the colored light through said coloring layer to the viewer side;
wherein said at least one driving circuit is configured to, at an operating time in a transmissive display mode, perform a color display operation according to a successive additive color mixture method by dividing one frame into three fields to drive said liquid crystal panel in every field and by turning ON said light emitting elements including one emitting red light, another emitting green light, and another emitting blue light, sequentially in terms of time, in synchronization with timing of driving said liquid crystal panel, and, at an operating time in a reflective display mode, perform a color display operation according to a juxtapositional additive color mixture method by driving said liquid crystal panel in every frame and by using light passing through said coloring layer corresponding to each of the three colors of red, green, and blue.

2. The liquid crystal display device according to claim 1, wherein said at least one driving circuit has a data signal distributing unit to distribute and input one kind of data signal, as said sub-pixel data signal, to said data electrodes selected based on a selecting signal corresponding to said successive additive color mixture method or said juxtapositional additive color mixture.

3. The liquid crystal display device according to claim 2, wherein said data signal distributing unit, at the operating time in the transmissive display mode, simultaneously selects said data electrodes corresponding to said three sub-pixels making up each pixel based on said selecting signal corresponding to said successive additive color mixture method and, at an operating time in a reflective display mode, selects said data electrodes corresponding to a color of said coloring layer based on said selecting signal corresponding to said juxtapositional additive color mixture method.

4. The liquid crystal display device according to claim 1, wherein said semi-transmissive light reflecting plate is provided outside of said liquid crystal panel and on a side opposite to the viewer side.

5. The liquid crystal display device according to claim 1, wherein said semi-transmissive light reflecting plate has a transmissive region formed inside of said liquid crystal panel to allow the colored light having entered from said light source to be transmitted and to output the colored light to the viewer side and a reflective region to reflect light having entered through said coloring layer from the viewer side and to output said light through said coloring layer to the viewer side for every sub-pixel, wherein said reflective region is formed in a manner to correspond to said coloring layer.

6. A method of driving a liquid crystal display device comprising a light source; a liquid crystal panel; and at least one driving circuit, wherein said light source comprises three kinds of light emitting elements each emitting light corresponding to a color out of three colors of red, green, and blue, wherein said liquid crystal panel comprises a plurality of data electrodes formed at predetermined intervals in a first direction to input a sub-pixel data signal for sub-pixels, a plurality of scanning electrodes formed at predetermined intervals in a second direction orthogonal to said first direction to input a scanning signal, a plurality of pixel cells formed in a region of intersections of each of said data electrodes and each of said scanning electrodes, said sub-pixels obtained by dividing each pixel into three regions corresponding to three colors of red, green, and blue, and a semi-transmissive light reflecting plate, wherein light fed from a viewer side or said light source is modulated in a manner to correspond to an image to be displayed by supply of said sub-pixel data signal to pixel cells selected by said scanning signal, wherein three kinds of coloring layers each corresponding to one each of the three colors of red, green, and blue, are formed in part on each of the three sub-pixels, wherein said semi-transmissive light reflecting plate allows colored light having entered from said light source to be transmitted and to output the colored light to the viewer side, to reflect light having entered through said coloring layer from the viewer side, to output the colored light through said coloring layer to the viewer side, the method comprising:
at an operating time in a transmissive display mode, making said at least one driving circuit perform a color display operation according to a successive additive color mixture method by dividing one frame into three fields to drive said liquid crystal panel in every field and by turning ON said light emitting elements including one emitting red light, another emitting green light, and another emitting blue light, sequentially in terms of time, in synchronization with timing of driving said liquid crystal panel, and
at an operating time in a reflective display mode, making said at least one driving circuit perform a color display operation according to a juxtapositional additive color mixture method by driving said liquid crystal panel in every frame and by using light passing through said coloring layer corresponding to each of the three colors of red, green, and blue.

7. The method of driving the liquid crystal display device according to claim 6, further comprising a step of distributing and inputting one kind of data signal, as said sub-pixel data signal, to said data electrodes selected based on a selecting signal corresponding to said successive additive color mixture method or said juxtapositional additive color mixture.

8. The method of driving the liquid crystal display device according to claim 7, still further comprising: at the operating time in the transmissive display mode, simultaneously selecting said data electrodes corresponding to three sub-pixels making up each pixel based on said selecting signal corresponding to said successive additive color mixture method and, at the operating time in the reflective display mode, selecting said data electrodes corresponding to a color of said coloring layer based on said selecting signal corresponding to said juxtapositional additive color mixture method.

9. A liquid crystal display device comprising:
  a light source;
  a liquid crystal panel; and
  at least one driving means, wherein said light source comprises:
  a plurality of colored light emitting elements each emitting colored light corresponding to one each of a plurality of colors;
  wherein said liquid crystal panel comprises:
  a plurality of data electrodes formed at predetermined intervals in a first direction, each of which inputs a sub-pixel data signal for sub-pixels;
  a plurality of scanning electrodes formed at predetermined intervals in a second direction orthogonal to said first direction, each of which inputs a scanning signal;
  a plurality of pixel cells formed in a region of intersections of each of said data electrodes and each of said scanning electrodes, said sub-pixels obtained by dividing each pixel into a plurality of regions corresponding to one each of the plurality of the colors; and
  a semi-transmissive light reflecting means,
  wherein light fed from a viewer side or said light source is modulated in a manner to correspond to an image to be displayed by supply of said sub-pixel data signal to pixel cells selected by said scanning signal;
  wherein a plurality of coloring layers each corresponding to one each of the plurality of the colors, are formed in part on each of the sub-pixels;
  wherein said semi-transmissive light reflecting means allows colored light having entered from said light source to be transmitted and to output the colored light to the viewer side, to reflect light having entered through said coloring layer from the viewer side, to output the colored light through said coloring layer to the viewer side;
  wherein said at least one driving means is configured to, at an operating time in a transmissive display mode, perform a color display operation according to a successive additive color mixture method by dividing one frame into the plurality of fields to drive said liquid crystal panel in every field and by turning ON and OFF a plurality of said colored light emitting elements, sequentially in terms of time, in synchronization with timing of driving said liquid crystal panel, and, at an operating time in a reflective display mode, perform a color display operation according to a juxtapositional additive color mixture method by driving said liquid crystal panel in every frame and by using light passing through said coloring layer corresponding to each of the plurality of the colors.

10. The liquid crystal display device according to claim 9, wherein said at least one driving means has a data signal distributing means to distribute and input one kind of data signal, as said sub-pixel data signal, to said data electrodes selected based on a selecting signal corresponding to said successive additive color mixture method or said juxtapositional additive color mixture.

11. The liquid crystal display device according to claim 10, wherein said data signal distributing means, at the operating time in the transmissive display mode, simultaneously selects said data electrodes corresponding to said three sub-pixels making up each pixel based on said selecting signal corresponding to said successive-additive color mixture method and, at an operating time in a reflective display mode, selects said data electrodes corresponding to a color of said coloring layer based on said selecting signal corresponding to said juxtapositional additive color mixture method.

12. The liquid crystal display device according to claim 9, wherein said semi-transmissive light reflecting means is provided outside of said liquid crystal panel and on a side opposite to the viewer side.

13. The liquid crystal display device according to claim 9, wherein said semi-transmissive light reflecting means has a transmissive region formed inside of said liquid crystal panel to allow the colored light having entered from said light source to be transmitted and to output the colored light to the viewer side and a reflective region to reflect light having entered through said coloring layer from the viewer side and to output said light through said coloring layer to the viewer side for every sub-pixel, wherein said reflective region is formed in a manner to correspond to said coloring layer.

* * * * *